US008841384B2

(12) United States Patent
Rascalou et al.

(10) Patent No.: US 8,841,384 B2
(45) Date of Patent: Sep. 23, 2014

(54) MATERIAL COMPRISING POLYAZACYCLOALKANES, GRAFTED ON POLYPROPYLENE FIBRES, ITS PROCESS OF PREPARATION, AND PROCESS FOR REMOVING METAL CATIONS FROM A LIQUID

(75) Inventors: Frédéric Rascalou, Rouen (FR); Franck Denat, Dijon (FR); Roger Guilard, Fontaine les Dijon (FR); Jean-Louis Babouhot, Fontaine les Dijon (FR); Hervé Chollet, Dijon (FR); Michel Meyer, Dijon (FR)

(73) Assignee: Commissariat a l'Energie Atomique, Paris (FR)

( * ) Notice: Subject to any disclaimer, the term of this patent is extended or adjusted under 35 U.S.C. 154(b) by 1036 days.

(21) Appl. No.: 12/523,330

(22) PCT Filed: Jan. 14, 2008

(86) PCT No.: PCT/FR2008/050062
§ 371 (c)(1),
(2), (4) Date: Oct. 8, 2009

(87) PCT Pub. No.: WO2008/099114
PCT Pub. Date: Aug. 21, 2008

(65) Prior Publication Data
US 2010/0059446 A1    Mar. 11, 2010

(30) Foreign Application Priority Data

Jan. 16, 2007 (FR) .................................. 07 52696

(51) Int. Cl.
| | |
|---|---|
| *C08F 255/02* | (2006.01) |
| *C08J 7/16* | (2006.01) |
| *C08F 8/30* | (2006.01) |
| *D06M 14/10* | (2006.01) |
| *D06M 14/28* | (2006.01) |

(52) U.S. Cl.
CPC ............... *D06M 14/10* (2013.01); *C08F 8/30* (2013.01); *D06M 14/28* (2013.01)
USPC ............ 525/242; 525/243; 525/263; 525/279

(58) Field of Classification Search
USPC ................................. 525/242, 243, 263, 279
See application file for complete search history.

(56) References Cited

U.S. PATENT DOCUMENTS

| | | | |
|---|---|---|---|
| 3,073,667 A * | 1/1963 | Bonvicini et al. ............ | 8/513 |
| 5,631,368 A | 5/1997 | Schultze et al. | |
| 5,677,446 A | 10/1997 | Schultze et al. | |
| 5,891,574 A | 4/1999 | Guilard et al. | |
| 6,232,265 B1 | 5/2001 | Bruening et al. | |
| 6,372,903 B1 | 4/2002 | Mehdi et al. | |
| 6,410,143 B1 | 6/2002 | Guilard et al. | |
| 6,479,159 B1 | 11/2002 | Bruening et al. | |
| 7,083,732 B1 | 8/2006 | Chollet et al. | |

FOREIGN PATENT DOCUMENTS

| | | |
|---|---|---|
| EP | 0 287 436 | 10/1988 |
| EP | 0 427 595 | 5/1991 |
| FR | 2 774 092 | 7/1999 |
| FR | 2 789 380 | 8/2000 |
| JP | 2001 123381 | 5/2001 |
| WO | 96 11056 | 4/1996 |
| WO | 96 11189 | 4/1996 |
| WO | 96 11478 | 4/1996 |
| WO | 96 28433 | 9/1996 |
| WO | 01 15806 | 3/2001 |
| WO | 01 46202 | 6/2001 |

OTHER PUBLICATIONS

Motomura et al., CAPLUS AN 1999:629773, Oct. 1999.*
Bradshaw, Jerald S. et al., "New Nitrogen-Containing Macrocyclic Ligands Covalently Attached to Silica Gel and Their use in Separating Metal Cations", Solvent Extraction and Ion Exchange, vol. 7, No. 5, pp. 855-864, (1989).
Izatt, Reed M. "Review of selective Ion Separations at Byu Using Liquid Membrane and Solid Phase Extraction Procedures", Journal of Inclusion Phenomena and Molecular Recognition in Chemistry, vol. 29, pp. 197-220, (1997).
Woehrle, Dieter et al., "Synthesis of Covalently Bound Polymeric Macrocyclic Amines and Amides", Polymer Bulletin, vol. 15, pp. 185-192, (1986).
Louvet, Viviane et al., "Tetraaza 1.4.8.11, Cyclotetradecane Greffe Sur Polymere: Synthese et Application A L'Extraction de $Cu^{2+}$ $Ni^{2+}$ et $Co^{2+}$", Tetrahedron Letters, Vo. 23, No. 24, pp. 2445-2448, 1982, (with English abstract).
Szczepaniak, Walenty et al., "Synthesis and Properties of a Chelating Resin Containing a Macrocyclic Tetraaza System as Active Group", Reactive Polymers, Elsevier Science Publishers B.V., vol. 3, pp. 101-106, (1985).
Kavakli, Cengiz et al., "1,4,8,11-Tetraazacyclotetradecane bound to poly(p-chloromethylstyrene-ethylene glycol dimethacrylate) microbeads for selective gold uptake", Analytica Chimica Acta, vol. 464, pp. 313-322, (2002).
Altava, B. et al., "Preparation of Polymer-Supported Polyazamacrocycles. The Role of the Polymeric Matrix in the Preparation of Polymer-Supported Polyzamacrocycles", Ind. Eng. Chem. Res., vol. 39, No. 10, pp. 3589-3595, (2000).
Choi, Seong-Ho et al., "Adsorption of $UO_2^{2+}$ By Polyethylene Hollow Fiber Membrane with Amidoxime Group", J.M.S.-Pure Appl. Chem., vol. A37, No. 9, pp. 1053-1068, (2000).
Kabay, N. et al., "Preparation of Fibrous Adsorbents Containing Amidoxime Groups by Radiation-Induced Grafting and Application to Uranium Recovery from Sea Water", Journal of Applied Polymer Science, vol. 49, pp. 599-607, (1993).
Dessouki, A.M. et al., "Chemical reactive filter paper prepared by radiation-induced graft polymerization-I" Radiation Physics and Chemistry, Pergamon, vol. 54, pp. 627-635, (1999).

(Continued)

*Primary Examiner* — Jeffrey Mullis
(74) *Attorney, Agent, or Firm* — Oblon, Spivak, McClelland, Maier & Neustadt, L.L.P.

(57) ABSTRACT

Material composed of a polyazacycloalkane grafted on polypropylene fibres.
Process for the preparation of this material.
Process for removing metal cations present in a liquid by bringing this liquid into contact with the said material.

23 Claims, 3 Drawing Sheets

(56) References Cited

OTHER PUBLICATIONS

Saliba, Rima et al., "Adsorption of Copper(II) and Chromium(III) Ions onto Amidoximated Cellulose" Journal of Applied Polymer Science, vol. 75, pp. 1624-1631, (2000).

Fischer, H.-J. et al., "Syntheses of cellulose exchangers carrying chelating anchor groups for selective separation of uranyl ions", Die Angewandte Makromolekulare Chemie, vol. 208, No. 3609, pp. 133-150, (1993).

Bicak, Niyazi et al., "Graft copolymer of acrylamide onto cellulose as mercury selevtive sorbent", Reactive & Functional Polymers, Elsevier, vol. 41, pp. 69-76, (1999).

Chang Xijun, et al., "Synthesis of poly($N$-aminoethyl)acrylamide chelating fiber and properties of concentration and separation of noble metal ions from samples", Talanta, Elsevier, vol. 43, pp. 407-413, (1996).

Gong, Bolin "Synthesis of polyacrylaminoimidazole chelating fiber and properties of concentration and separation of trace Au, Hg and Pd from samples", Talanta, Elsevier, vol. 57, pp. 89-95, (2002).

Chang, Xijun et al., "Efficiency and application of poly(acryldinitrophenylamidrazone-dinitroacrylphenylhydrazine) chelating fiber for pre-concentrating and separating trace Au(III), Ru(III), In(III), Bi(III), Zr(IV), V(V), Ga(III) and Ti(IV) from solution samples", Talanta, Elsevier, vol. 57, pp. 253-261, (2002).

Choi, Seong-Ho et al., "Adsorption of $Co^{2+}$ and $Cs^{1+}$ by polyethylene membrane with Iminodiacetic Acid and Sulfonic Acid Modified by Radiation-Induced Graft Copolymerization", Journal of Applied Polymer Science, vol. 71, pp. 999-1006, (1999).

Thuaut, Philippe Le et al., "Grafting of Cyclodextrins onto Polypropylene Nonwoven Fabrics for the Manufacture of Reactive Filters", Journal of Applied Polymer Science, vol. 77, pp. 2118-2125, (2000).

Martel, Bernard et al., "Grafting of Cyclodextrins onto Polypropylene Nonwoven Fabrics for the Manufacture of Reactive Filter. II. Characterization", Journal of Applied Polymer Science, vol. 78, pp. 2166-2173, (2000).

Buyuktuncel, Ebru et al., "Poly(vinylalcohol) coated / Cibacron Blue F3GA-attached polypropylene hollow fiber membranes for removal of cadmium ions from aquatic systems", Reactive & Functional Polymers, Elsevier, vol. 47, pp. 1-10, (2001).

Cho, Dong Lyun et al, "Fabrication of Deodorizing Fabric by Grafting of Metal Phthalocyanine Derivative onto Nonwoven Polypropylene Fabric", Journal of Applied Polymer Science, vol. 82, pp. 839-846, (2001).

Degni, Sylvestre et al., "Immobilization of Chiral Ligands on Polymer Fibers by Electron Beam Induced Grafting and Applications in Enantioselective Catalysis", Organic Letters, vol. 3, No. 16, pp. 2551-2554, (2001).

Lopergolo, L.C. et al., "Development of reinforced hydrogels-I. Radiation induce graft copolymerization of methylmethacrylate on non-woven polypropylene fabric", Radiation Physics and Chemistry, Pergamon, vol. 57, pp. 451-454,(2000).

Yun Lu et al., "Studies on Preparation and Ion-Exchange Properties of Weakly Acidic Cation Exchange Fiber by Preirradiation-Induce Graft Copolymerization with Electron Beam", Journal of Applied Polymer Science, vol. 53, pp. 405-410, (1994).

Daitao, Chen et al., "Study of Electron Beam Preirradiation-Induced Graft Copolymerization of Acrylic Acid onto Powdered Isotactic Polypropylene", Journal of Applied Polymer Science, vol. 73, pp. 1357-1362, (1999).

Choi, Seong-Ho et al., "Electrochemical properties of polyolefin nonwoven fabric modified with carboxylic acid group for battery separator", Radiation Physics and Chemistry, Pergamon, vol. 60, pp. 495-502, (2001).

Xu, Zhikang et al., "Microporous polypropylene hollow fiber membrane Part I. Surface Modification by the graft polymerization of acrylic acid", Journal of Membrane Science, vol. 196, pp. 221-229, (2002).

Kaur, Inderjeet et al., "Graft Copolymerization of 2-Vinyl Pyridine and Styrene onto Isotactic Polypropylene Fibres by Pre-irradiation", Polymers & Polymer Composites, vol. 3, No. 5, pp. 375-383, (1995).

Tan, Shaozao et al., "Study of Modified Polypropylene Nonwoven Cloth. I. Graft Copolymerization of 4-Vinylpyridine onot Polypropylene Nonwoven Cloth by Preirradiation Method", Journal of Applied Polymer Science, vol. 77, pp. 1861-1868, (2000).

Ivanchev, S. S. et al., "Radiation Grafting of Vinylalkoxysilanes onto Polypropylene" Vysolkomolekulyarnye Soedineniya, Seriya A, vol. 43, No. 5, pp. 793-798, 2001, (with English abstract).

Tsuchida, Eishun et al., "Discussion on the Mechanism of Alternating Copolymerization of Styrene and Maleic Anhydride", Die Macromolekulare Chemie, vol. 141, No. 3488, pp. 265-298, (1971).

Chauhan, Ghanshyam S. et al., "Polymers From Renewable Resources. II. A Study in the Radio Chemical Grafting of Poly(styrene-alt-maleic anhydride) onto Cellulose Extracted From Pine Needles", Journal of Polymer Science: Part A: Polymer Chemistry, vol. 37, pp. 1763-1769, (1999).

Abd El-Rehim, H.A. et al., "Selective removal of some heavy metal ions from aqueous solution using treated polyethylene-g-styrene / maleic anhydride membranes", Reactive & Functional Polymers, Elsevier, vol. 43, pp. 105-116, (2000).

Clark, D. C. et al., "Peroxide-Initiated Comonomer Grafting of Styrene and Maleic Anhydride onto Polyethylene: Effect of Polyethylene Microstructure", Journal of Applied Polymer Science, vol. 79, p. 96-107, (2001).

Jia, Demin et al., "Synthesis and Characterization of Solid-Phase Graft Copolymer of Polypropylene with Styrene and Maleic Anhydride", Journal of Applied Polymer Science, vol. 78, pp. 2482-2487, (2000).

Citovicky, P. et al., "The Copolymerization of Styrene and Maleic Anhydride Initiated by Peroxides of Isotactic Polypropylene", Eur. Polym. J., Pergamon, vol. 32, No. 2, pp. 153-158, (1996).

Andrews, L. J. et al., "The Interaction of Dienophiles with Aromatic Substances", Journal of the American Chemical Society, vol. 75, pp. 3776-3779, (1953).

Rzaev, Z. M. et al., "Charge Transfer Complexes of maleic Anhydride in Radical Homo- and Copolymerization", J. Polymer Sci.: Symposium No. 42, pp. 519-529, (1973).

Iwatsuki, Shouji et al., "The Charge Transfer Complex Formation between $p$-Dioxene and Maleic Anhydride and their Participation in Polymerization", Die Makromolekulare Chemie, vol. 89, pp. 205-213, (1965).

Barbette, F. "Etude de nouveaux macrocylclse pour la complexation des actinides. Validation pour la purification des effluents aqueux", These De L'Universite De Bourgogne [Thesis of the University of Burgundy, pp. 25-207, (1999).

Prikryl, James D. et al., "Uranium$^{VI}$ sorption behavior on silicate mineral mixtures", Journal of Contaminant Hydrology, vol. 47, pp. 241-253, (2001).

Chollet, H. "Utilisation de macrocycles tetraazotes pour la complexation des actinides en milieu aqueux. Validation pour le retraitement des effluents liquids aqueux", These De L'Universite De Bourgogne [Thesis of the University of Burgundy], pp. 1-175, (1994).

Nho, Y.C. et al., "Grafting polymerization of styrene onto preirradiated polypropylene fabric", Radiation Physics and Chemistry, Pergamon, vol. 54, pp. 317-322, (1999).

Patel, Alpesh C. et al., "Solid phase grafting of various monomers on hydroperoxidized polypropylene", European Polymer Journal, Elsevier, vol. 36, pp. 2477-2484, (2000).

Kaur, Inderjeet et al., "Graft copolymerization of 2-vinyl pyridine and styrene onto isotactic polypropylene powder by the prierradiation method", Materials Science & Engineering, Elsevier, vol. A270, pp. 137-144, (1999).

Amigoni-Gerbier, Sonia et al., "Synthesis and Properties of Selective Metal-Complexing Nanoparticles", Macromolecules, vol. 32, No. 26, pp. 9071-9073, (1999).

* cited by examiner

MATERIAL COMPRISING POLYAZACYCLOALKANES, GRAFTED ON POLYPROPYLENE FIBRES, ITS PROCESS OF PREPARATION, AND PROCESS FOR REMOVING METAL CATIONS FROM A LIQUID

TECHNICAL FIELD

The present invention relates to a material comprising, preferably composed of (consisting in), polyazacycloalkanes, grafted on (to) polypropylene fibres. The invention relates in addition to a process for the preparation of this material.

Finally, the invention relates to a process for removing metal cations from a liquid, in particular an aqueous liquid, by bringing the said liquid into contact with the said material.

The said metal cations can be cations of heavy metals, such as copper, zinc, cadmium, tantalum or gold, but they are more particularly cations of radioactive elements of the family of the actinides or lanthanides and the present invention thus applies more particularly to the complete decontamination of alpha-contaminated aqueous effluents.

The technical field of the invention can more generally be defined as that of the materials used in the ultrapurification of liquids and more specifically in the technique for the solid-liquid extraction of polluting metals dissolved in effluents.

The use of materials prepared following the grafting of polyazamacrocyclic ligands and in particular tetraazamacrocyclic ligands to a support in a solid-liquid extraction technique is known for applications for the exhaustive, full, purification of aqueous effluents. The selectivity of these complexing molecules for transition metals, post-transition metals, lanthanides and actinides at the expense of alkali metals and alkaline earth metals present in predominant amount makes them very good candidates for the recovery of these elements present in the form of traces. Thus, the grafting of polyazamacrocyclic and in particular tetraazamacrocyclic molecules on (to) a silica support and to organic resins of Merrifield type has already been described.

Grafting to a Silica Support

The grafting of macrocyclic ligands on (to) silica (essentially crown ethers and calixarenes but also polyazaoxamacrocycles and a few polyazamacrocycles[1]) has already formed the subject of developments and solid-liquid extraction processes for laboratory analytical (assaying of lead[2]), industrial (recovery of precious metals, such as platinum[2]) or environmental (decontamination of effluents from the nuclear industry: scavenging of strontium[2] or plutonium and americium[3]) applications have been marketed.

Various functionalised polyazacycloalkanes have been grafted on (to) an inorganic support[4] [5] [6] [7] [8].

The above studies have made it possible to validate this technique for ultimate purification on the semi-industrial scale. The final treatment of 50 m³ of radioactive effluents with a material composed of a tetraazamacrocyclic ligand grafted on (to) a silica has been achieved[8].

The material developed above will thus, in the examples given below, be regarded as the reference material for comparing the extraction performances of the materials according to the invention.

However, there are weaknesses to this silica-based chelating material, more related to its viability when used industrially than to its extractive performances proper. The silica support is the cause of the following disadvantages:

limited forming of the material, in the powder form, which virtually restricts its use to a column process;

high head losses of the column process, which bring about a moderate treatment flow rate (50 l/h);

the tedious conditioning of the material, comprising numerous operations, such as removal of air bubbles, the packing of the silica gel, and the like;

the attrition of the silica, which causes clogging.

Grafting to Organic Resins 1,4,8,11-Tetraazacyclotetradecane (cyclam) has been grafted on (to) polystyrene resins[9] for the recovering in essentially aqueous solutions of copper, nickel, cobalt, zinc[10, 11] or gold[12].

The same extractive properties are observed with chelating resins obtained by radical polymerisation of N-(4-vinylbenzyl)cyclam[13-15]. The extractive performances with respect to radioelements of functionalised tetraazamacrocycles grafted to Merrifield resins have also been tested[6].

The materials prepared based on Merrifield resins have shown poorer extractive performances, attributed to the hydrophobicity and the strong crosslinking of the support[6] resulting in slow complexing kinetics.

The only two known supports to which polyazamacrocyclic and in particular tetraazamacrocyclic molecules are grafted are thus silica and organic resins. Neither of these supports exhibits all the desired properties, either in terms of efficiency in scavenging the pollutants or in terms of performance of the associated process, for industrial use in a solid-liquid extraction technique.

Furthermore, organic fibres, on the other hand, exhibit certain advantages as support for ligands, such as: a variety of possible formings of the material, ready integration in a solid-liquid extraction process and possible incineration of the material at the end of life.

The use of grafted organic fibres for applications in the treatment of water is reported in numerous cases but recourse to such a support is generally unknown in fixing polynitrogenous, for example tetranitrogenous, macrocyclic ligands. A fortiori, the grafting of such macrocycles to polypropylene fibres is neither mentioned nor suggested in the prior art.

The state of the art thus refers to the preparation of chelating fibres or membranes for applications in the purification of aqueous solutions contaminated by heavy metals or radioelements. For example, for the recovery of the uranyl present in seawater, "reactive filters" have been prepared by introducing amidoxime functional groups onto polyethylene[16], polypropylene[17] or cellulose[18] fibre. The last material has also been prepared in order to fix Cr(III) and Cu(II)[19].

Likewise, numerous materials with a fibrous texture are prepared in order overall to scavenge the group of the heavy metals: these materials are generally prepared by modification of a support by introduction of a large amount of coordinating functional groups. Thus, polycarboxylic acids[20], polycarboxyamines[21], amine[22] functional groups and amide[23] functional groups have been grafted to cellulose; amide[24], imidazole[25] and hydrazine[26] functional groups have been grafted to polyacrylonitrile; and iminodiacetic[27] functional groups have been grafted to polyethylene.

On the other hand, the grafting to organic fibres of molecules (in particular macrocyclic molecules) selective for specific extractive applications is much rarer. The fixing of the linear EGTA ligand to cellulose provides a degree of selectivity in the recovery of cadmium with respect to that of zinc[28]. α-Cyclodextrin, β-cyclodextrin and γ-cyclodextrin have been fixed to polypropylene fibre in order to scavenge organic molecules in the macrocyclic cavity[29, 30]. The dye Cibacron Blue F3GA, which exhibits an affinity for various heavy metals and a pronounced selectivity towards cadmium, has been immobilised on a hollow polypropylene fibre by adsorption[31]. Applications in heterogeneous catalysis are described by grafting phthalocyanine to polypropylene fibre[32] or taddol to polyethylene fibre[33].

There thus exists, in the light of the above, a need for a material which, while retaining an excellent scavenging selectivity of the polyazamacrocyclic, in particular tetraazamacrocyclic, molecules with regard to heavy metals, lanthanides or actinides, can be easily employed industrially, does not exhibit the failings mentioned above of materials comprising a polyazamacrocycle, such as a polyazacycloalkane, grafted to silica in terms of limited forming, of high head loss, of tedious conditioning and of adhesion and does not exhibit either the failings in terms of poor extractive performance of the materials in which a polyazamacrocycle is immobilised on a support made of organic resin, such as a "Merrifield" resin.

In other words, there exists a need for a material which, while exhibiting excellent extractive performances of a material composed of a polyazacycloalkane ligand grafted to silica, does not exhibit all the disadvantages thereof during use, in particular at the industrial stage.

The aim of the present invention is to provide a material comprising polyazamacrocycles which meet, inter alia, the abovementioned needs.

The aim of the present invention is also to provide a material comprising polyazamacrocycles, mainly intended for the removal of metal ions from a liquid, which does not exhibit the disadvantages, failings, limitations and drawbacks of the materials of the prior art, such as the materials composed of polyazamacrocycles grafted to silica or Merrifield resins.

The aim of the present invention is also to provide such a material which solves the problems of the materials of the prior art.

SUMMARY OF THE INVENTION

This aim, and yet others, are achieved in accordance with the invention by a material comprising, preferably composed of (consisting in), a polyazacycloalkane grafted on (to) polypropylene fibres.

It should be noted that, in the present text, the term "grafting" denotes grafting via a covalent chemical bond, in contrast to physical or electrostatic fixing, such as adsorption.

The grafting of polynitrogenous macrocyclic ligands, such as polyazacycloalkanes, on (to) organic fibres, and what is more on (to) polypropylene fibres, has never been mentioned nor suggested in the prior art.

It may be said that the invention is based on the preparation of novel materials, resulting from the grafting of polyazamacrocyclic, for example tetraazamacrocyclic, molecules on (to) a support based on polypropylene fibres. The polynitrogenous, in particular tetranitrogenous, macrocyclic ligands are highly selective for the scavenging of heavy metals, lanthanides and actinides, and propylene fibres, propylene being an organic and thus incineratable material, exhibit a great diversity of possible uses, which makes it easy to incorporate them in a process and confers on them certain advantages for an industrial application. The extractive properties of these novel materials are highly satisfactory with regard to heavy metals, such as cadmium, and radioelements, such as uranium and plutonium. The incorporation of these materials in a process makes possible applications in the treatment of liquid industrial effluents.

The material according to the invention surprisingly exhibits all the advantages of the materials of polyazacycloalkanes grafted to a silica support type and all the advantages of the materials of polyazacycloalkanes grafted to an organic resin support type but without exhibiting any of the disadvantages of these two types of materials.

The material according to the invention solves the problems exhibited by the materials of the prior art.

DETAILED DESCRIPTION OF THE INVENTION

Figure 1:
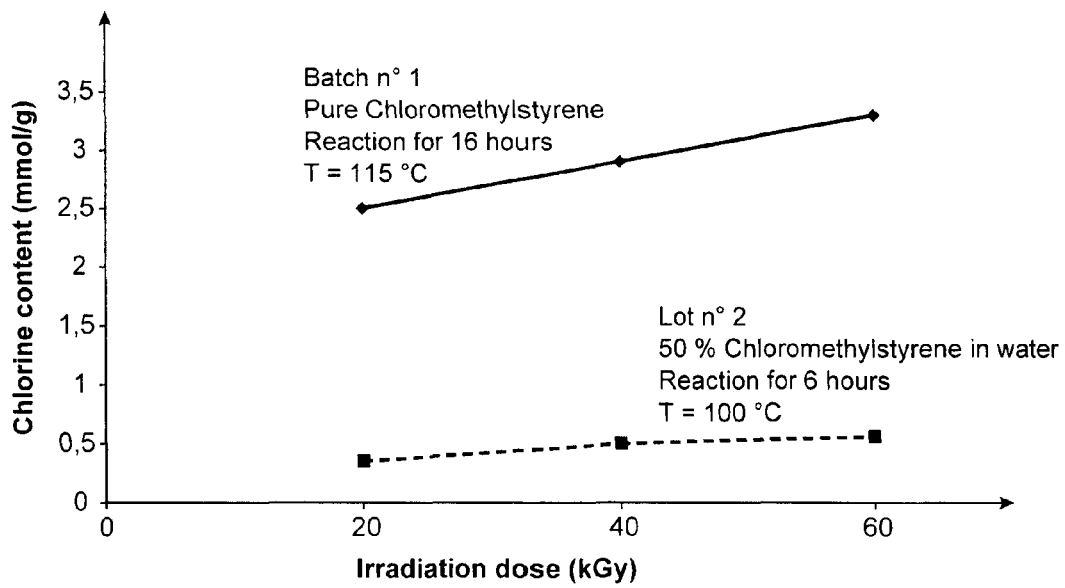
FIG. 1 shows the influence of irradiation dose on grafting according to one embodiment of the invention.

According to a first embodiment, the material according to the invention is capable of being prepared (is obtainable) by radical polymerisation of a polyazacycloalkane monomer carrying a group which can be polymerised under radical conditions (radically polymerizable), in the presence of polypropylene fibres carrying peroxide and/or hydroperoxide functional groups, optionally followed by a functionalisation of the optional free amine functional groups of the polyazacycloalkane and/or by saponification, hydrolysis of the ester functional groups optionally carried by the polyazacycloalkane.

The said polyazacycloalkane monomer corresponds to one of the three formulae:

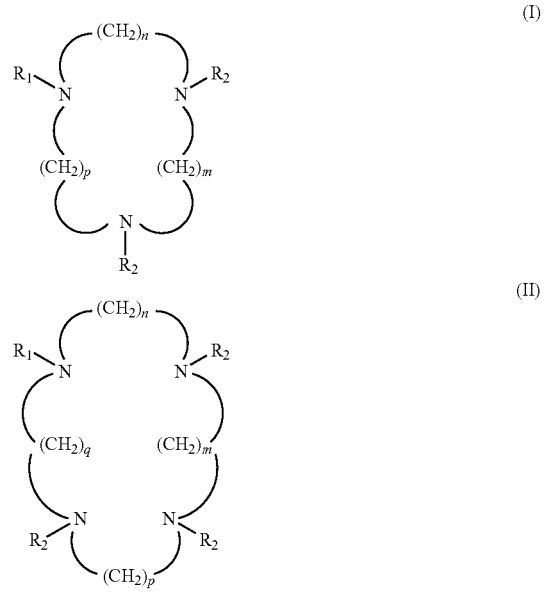

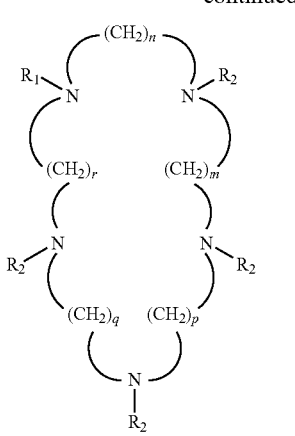
(III)

in which n, m, p, q and r, which may be identical or different, are equal to 2 or 3; $R_1$ is a group which can be polymerised under radical conditions; $R_2$ represents a hydrogen atom or a $(CH_2)_2$—$R_3$ group, $R_3$ being a group chosen from the group consisting of $CONH_2$, $CH_2OH$, $CN$ and $COOR_4$, $R_4$ representing H, a cation, such as Na, an alkyl group of 1 to 10 carbon atoms or a benzyl group; or $R_2$ represents the —$(CH_2)$—$R_5$ group, $R_5$ representing $COOR_6$ or $PO_3R_6$, $R_6$ representing an alkyl group of 1 to 10 carbon atoms, a hydrogen atom or a cation, such as Na.

The group which can be polymerised under radical conditions (which is radically polymerizable) is preferably chosen from the groups comprising a vinyl, styrene or acrylic group.

Thus, the group which can be polymerised under radical conditions can be chosen from acrylonitrile, acrylate, acrylic acid, vinylpyridine, vinylalkoxysilane and 4-vinylbenzyl groups.

Preferred polyazacycloalkane monomers are chosen from N-(4-vinylbenzyl)cyclam and N,N',N''-tris(2-ethoxycarbonylethyl)-N'''-(4-vinylbenzyl)cyclam.

The material according to the invention in this first embodiment can correspond to the following formula:

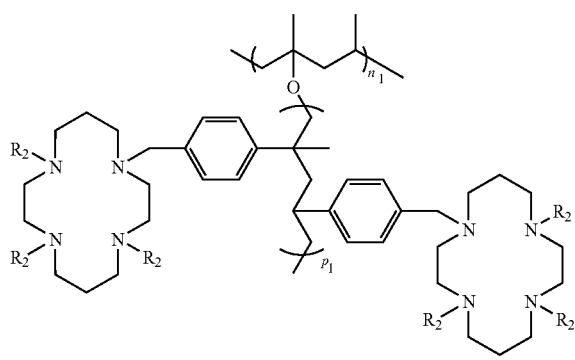
(IV)

in which:
$R_2$ has the meaning already given above;
$n_1$ is an integer from 100 to 3000;
$p_1$ is an integer from 10 to 1000.
$R_2$ preferably represents H or $CH_2CH_2COOEt$ or $CH_2CH_2COOH$ or $CH_2CH_2COONa$ or $CH_2COOEt$ or $CH_2COOH$ or $CH_2COONa$.

The material of formula (IV) results from a polyazacycloalkane monomer of formula (II). The man skilled in the art can easily determine the corresponding formulae to which the materials resulting from the polyazacycloalkane monomers of formula (I) or (III) can correspond.

According to a second embodiment, the material according to the invention is capable of being prepared (is obtainable) by the following successive steps:

a) the radical polymerisation of one or more monomers which can be polymerised under radical conditions is carried out in the presence of polypropylene fibres carrying peroxide and/or hydroperoxide functional groups, at least one of the said monomers comprising at least one functional group capable of reacting with a free amine functional group (this generally concerns amine functional groups of the ring, forming an integral part of the ring of the polyazacycloalkane; the N of the amine forms part of the ring of the polyazacycloalkane; these functional groups are generally regarded as secondary amine functional groups) of a polyazacycloalkane; by means of which a polymer is obtained which comprises the said functional groups capable of reacting with a free amine functional group of a polyazacycloalkane grafted on the polypropylene;

b) the said polymer is reacted with a polyazacycloalkane;

c) optionally, the free amine functional group or groups, optionally still present, of the polyazacycloalkane are functionalised;

d) optionally, the ester functional groups optionally carried by the polyazacycloalkane are saponified, hydrolysed.

The functional group capable of reacting with the amine functional group of the polyazacycloalkane may be chosen from electrophilic carbons, for example carbons carrying halide, OTs or OTf functional groups, and the like, or carboxylic acid derivatives, for example acyl halides, anhydrides, esters, and the like.

The monomers which polymerise can be chosen from vinyl, styrene or acrylic monomers, and the like. Examples of these monomers are chloromethylstyrene and maleic anhydride.

It is possible to polymerise only a single monomer, in which case, on conclusion of the first step, a homopolymer of the said monomer is obtained, for example a homopolymer of chloromethylstyrene, grafted on (to) polypropylene fibres.

Alternatively, it is possible to polymerise, during the first step, a mixture of monomers, in which case, on conclusion of the first step, a copolymer is obtained, for example an alternating copolymer of chloromethylstyrene and maleic anhydride: poly(maleic anhydride-alt-chloromethylstyrene).

The polyazacycloalkane involved in stage b) according to this second embodiment may be chosen from the polyazacycloalkanes comprising one of the three following formulae (V), (VI) and (VII):

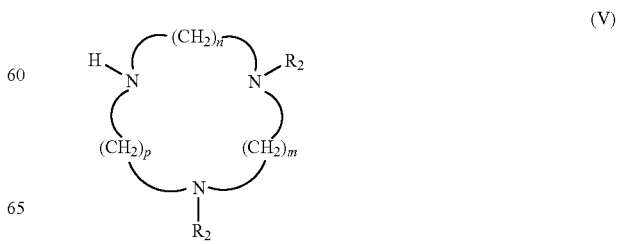
(V)

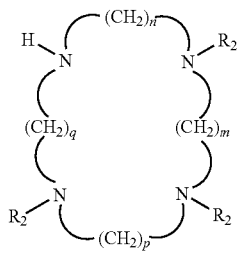

(VI)

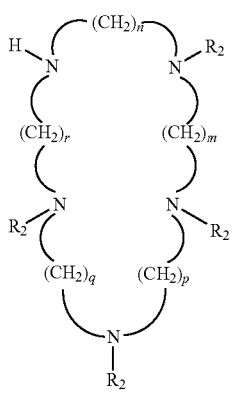

(VII)

in which n, m, p, q and r, which may be identical or different, are equal to 2 or 3; $R_2$ represents a hydrogen atom or a $(CH_2)_2$—$R_3$ group, $R_3$ being a group chosen from the group consisting of $CONH_2$, $CH_2OH$, $CN$ and $COOR_4$, $R_4$ representing H, a cation, such as Na, an alkyl group of 1 to 10 carbon atoms or a benzyl group; or $R_2$ represents the —$(CH_2)$—$R_5$ group, $R_5$ representing $COOR_6$ or $PO_3R_6$, $R_6$ representing an alkyl group of 1 to 10 carbon atoms, a hydrogen atom or a cation, such as Na.

This polyazacycloalkane is preferably chosen from the following compounds:

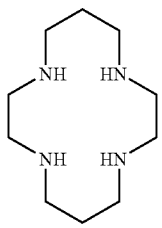

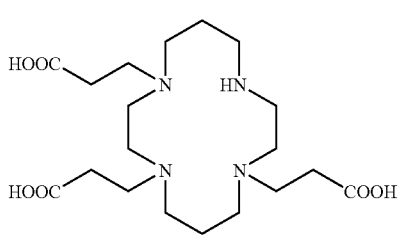

1,4,8-tris(2-carboxyethyl)-
1,4,8,11-tetraazacyclotetradecane
(TE3P)

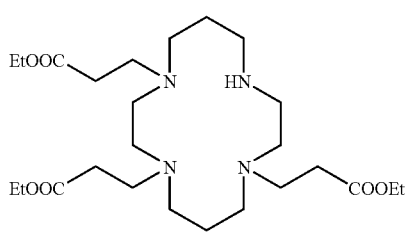

1,4,8-tris(ethoxycarbonylethyl)-
1,4,8,11-tetraazacyclotetradecane
(TE3PE)

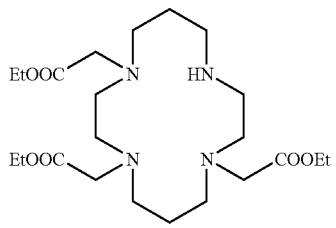

1,4,8-tris(ethoxycarbonylmethyl)-
1,4,8,11-tetraazacyclotetradecane
(TE3AE)

The material according to this second embodiment of the invention may correspond to the following formula (VIII) or to the following formula (IX):

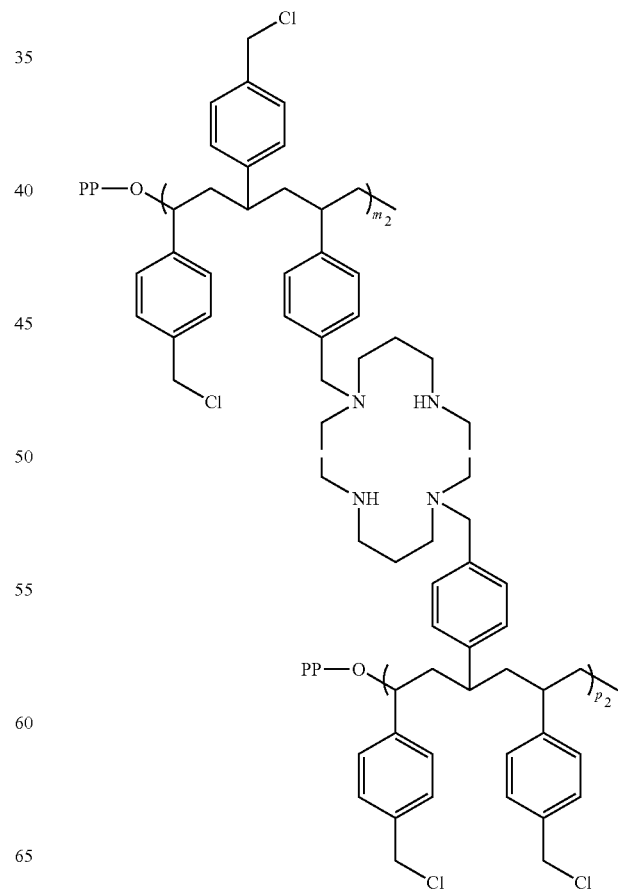

(VIII)

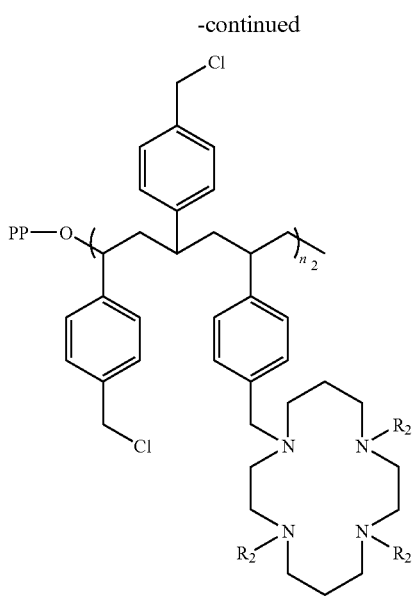

where:
R₂ has the meaning already given above;
$m_2$ is an integer from 10 to 1000;
$n_2$ is an integer from 10 to 1000;
P2 is an integer from 10 to 1000.

In the formulae (VIII) and (IX), $R_2$ preferably represents —(CH₂)₂COONa, —CH₂COOEt, —(CH₂)₂—COOEt, —(CH₂)₂—COOH, —CH₂—COOH or —CH₂—COONa.

The material of the formula (VIII) or of the formula (IX) results from a polyazacycloalkane of formula (VI). A person skilled in the art can easily determine the corresponding formulae to which the materials resulting from the polyazacycloalkanes of formula (V) or (VII) may correspond.

The functionalisation in the first and second embodiments of the material and of the process relates to the materials in which the polyazacycloalkane (which is already fixed on (to) or immobilised on the PP fibres) comprises free amine functional groups (secondary amine functional group of the ring of the polyazacycloalkane) and it is desired to provide it with chelating, complexing or coordinating functional groups, such as carboxyl or carboxylate functional groups, in the form of arms comprising a carboxyl or carboxylate ending.

This optional functionalisation of the free amine functional group or groups of the polyazacycloalkane may be carried out by reacting the said free amine functional group or groups with a compound comprising a functional group capable of reacting with a free amine functional group of a polyazacycloalkane and another functional group, such as a functional group chosen from the $R_3$ and $R_5$ groups already defined above, which is generally a coordinating or chelating functional group.

This compound can in particular be chosen from ethyl bromoacetate and ethyl acrylate.

When the polyazacycloalkane (grafted on (to) or immobilised on (to) the polypropylene fibres) comprises ester functional groups, it is preferable to carry out a hydrolysis, saponification of these ester functional groups in order to obtain carboxyl and/or carboxylate functional groups, for example COONa functional groups, which exhibit better chelating, complexing or coordinating properties than the ester functional groups.

This hydrolysis/saponification may be carried out in the presence of sodium hydroxide in a water/alcohol medium.

This hydrolysis/saponification simultaneously results in residual chlorinated endings, such as residual chloromethyl functional groups, in the case where the second embodiment of the material is concerned and where the polymer obtained on conclusion of the first step a) is a chloromethylstyrene homopolymer or an alternating copolymer of chloromethylstyrene and maleic anhydride grafted on (to) the polypropylene fibres, being largely hydrolysed, for example to approximately 75%.

Preferably, the saponification, hydrolysis of the ester functional groups is carried out under conditions that allow complete hydrolysis of the ester functional groups.

The conditions are, for example, as follows: reaction at 40° C. for 18 hours with 0.5N sodium hydroxide solution. Such conditions make possible complete hydrolysis of the ester functional groups, whereas a very partial hydrolysis of the amide functional groups is observed.

The fact that the hydrolysis/saponification generally of all the ester functional groups simultaneously results in the hydroxylation of a large part (for example 75%) of the residual chlorinated endings thus greatly increases the hydrophilicity and the wettability of the grafted fibres.

The intrinsic hydrophobicity of the polypropylene fibres is thus counterbalanced by the introduction of a sizeable number of hydrophilic functional groups, namely: the hydroxyl endings and the carboxylate functional groups of the ligand.

The polypropylene fibres can in particular be provided in the form of a nonwoven.

The polypropylene fibres carrying peroxide and/or hydroperoxide functional groups are prepared, for example, by irradiation of polypropylene fibres by electrons under an oxidising atmosphere, for example of air or of oxygen.

The invention additionally relates to a process for the preparation of the materials described above.

In a first embodiment of this process, in which the material according to the first embodiment of the material described above is prepared, the radical polymerisation of a polyazacycloalkane monomer carrying a group which can be polymerised under radical conditions is carried out in the presence of polypropylene fibres carrying peroxide and/or hydroperoxide functional groups, optionally followed by a functionalisation of the optional free amine functional groups of the polyazacycloalkane and/or by a saponification, hydrolysis of the ester functional groups optionally carried by the polyazacycloalkane.

The polyazacycloalkane monomer carrying a polymerisable group employed in this process generally corresponds to one of the following three formulae (I), (II) and (III):

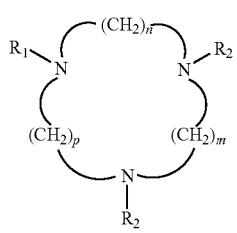

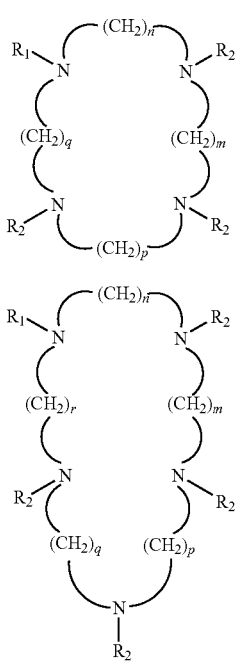

(II)

(III)

in which n, m, p, q and r, which may be identical or different, are equal to 2 or 3; $R_1$ is a group which can be polymerised under radical conditions; $R_2$ represents a hydrogen atom or a $(CH_2)_2$—$R_3$ group, $R_3$ being a group chosen from the group consisting of $CONH_2$, $CH_2OH$, CN or $COOR_4$, $R_4$ representing H, a cation, such as Na, an alkyl group of 1 to 10 carbon atoms or a benzyl group; or $R_2$ represents the —$(CH_2)$—$R_5$ group, $R_5$ representing $COOR_6$ or $PO_3R_6$, $R_6$ representing an alkyl group of 1 to 10 carbon atoms, a hydrogen atom or a cation, such as Na.

The said group which can be polymerised under radical conditions of the polyazacycloalkane monomer is generally chosen from the groups comprising a vinyl, acrylic or styrene group; in particular, this group can be chosen from acrylonitrile, acrylate, acrylic acid, vinylpyridine, vinylalkoxysilane and 4-vinylbenzyl groups.

A preferred polyazacycloalkane monomer may be chosen from N-(4-vinylbenzyl)cyclam and N,N',N''-tris(2-ethoxycarbonylethyl)-N'''-(4-vinylbenzyl)cyclam.

Generally, the polymerisation is carried out at a temperature of 80° C. to 120° C., for example of 105° C., in a solvent chosen from DMF, toluene, acetonitrile, and for a time period of 2 to 24 hours, for example of 13 hours.

In a second embodiment of the process according to the invention in which the material according to the second embodiment of the material described above is prepared, a process for the preparation of a material composed of a polyazacycloalkane grafted on (to) polypropylene fibres is carried out, the said process comprising the following successive steps:

a) the radical polymerisation of one or more monomers which can be polymerised under radical conditions is carried out in the presence of polypropylene fibres carrying peroxide and/or hydroperoxide functional groups, at least one of the said monomers comprising at least one functional group capable of reacting with a free amine functional group of a polyazacycloalkane; by means of which a polymer is obtained which comprises the said functional groups capable of reacting with a free amine functional group of a polyazacycloalcane, (the said polymer being) grafted to the polypropylene;

b) the said polymer is reacted with a polyazacycloalkane;

c) optionally, the free amine functional group or groups, optionally still present, of the polyazacycloalkane are functionalised;

d) optionally, the ester functional groups optionally carried by the polyazacycloalkane are saponified, hydrolysed.

The said free amine functional group is generally a secondary amine functional group —(NH)-forming an integral part of the ring of the polyazacycloalkane.

When free amine of the polyazacycloalkane is referred to, it generally concerns the free amines of the ring of the polyazacycloalkane generally regarded as secondary amines.

The functional group capable of reacting with the free amine functional group of the polyazacycloalkane is generally chosen from electrophilic carbons, for example carbons carrying halide, OTs or OTf functional groups, and the like, or carboxylic acid derivatives, for example acyl halides, anhydrides, esters, and the like.

The said monomers will thus preferably be chosen from vinyl, styrene or acrylic monomers, and the like.

Examples of these monomers are chloromethylstyrene and maleic anhydride.

It is possible to carry out the radical polymerisation of just one monomer (homopolymerisation), such as chloromethylstyrene, by means of which a homopolymer grafted generally to the surface of the PP fibres is then obtained.

When the polymerisation of chloromethylstyrene alone is carried out, this polymerisation is generally carried out in a solvent chosen from dimethylformamide (DMF), toluene, water or the water/methanol mixture; at a temperature of 80 to 120° C.; at a concentration by weight of chloromethylstyrene in the solvent of 30 to 55%; and for a time of 2 to 20 hours.

Preferably, this polymerisation of chloromethylstyrene is carried out in the solvent pure DMF; at a temperature of 80 to 115° C., preferably of 115° C.; at a concentration by weight of the chloromethylstyrene in the DMF of 40%; and for a time of 10 hours.

Alternatively, it is possible, during step a), to carry out the polymerisation of several monomers (copolymerisation). For example, the (co)polymerisation of maleic anhydride and of chloromethylstyrene can be carried out, generally at the surface of the PP. In this case, the polymerisation is carried out in a solvent chosen from toluene and acetone; at a temperature of 75 to 95° C.; at a concentration by weight of the monomers in the solvent of 10% to 80%, for example 30%; and for a time of 4 to 30 hours.

In step b), the polyazacycloalkane can be chosen from the polyazacycloalkanes corresponding to one of the three following formulae (V), (VI) and (VII):

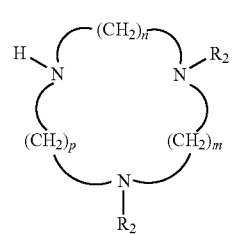

(V)

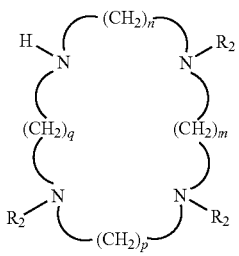

(VI)

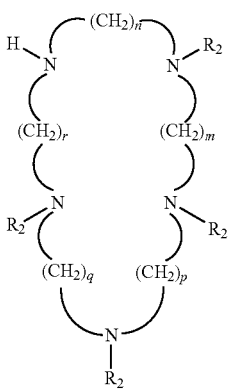

(VII)

in which n, m, p, q and r, which may be identical or different, are equal to 2 or 3; $R_2$ represents a hydrogen atom or a $(CH_2)_2$—$R_3$ group, $R_3$ being a group chosen from the group consisting of $CONH_2$, $CH_2OH$, CN and $COOR_4$, $R_4$ representing H, a cation, such as Na, an alkyl group of 1 to 10 carbon atoms or a benzyl group; or $R_2$ represents the —$(CH_2)$—$R_5$ group, $R_5$ representing $COOR_6$ or $PO_3R_6$, $R_6$ representing an alkyl group of 1 to 10 carbon atoms, a hydrogen atom or a cation, such as Na.

Preferably, the said polyazacycloalkane is chosen from the following compounds:

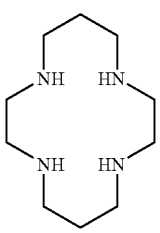

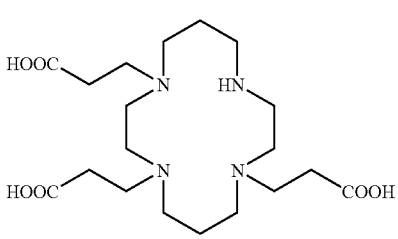

1,4,8-tris(2-carboxyethyl)-
1,4,8,11-tetraazacyclotetradecane
(TE3P)

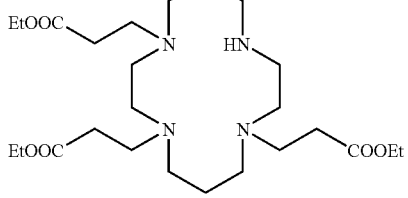

1,4,8-tris(ethoxycarbonylethyl)-
1,4,8,11-tetraazacyclotetradecane
(TE3PE)

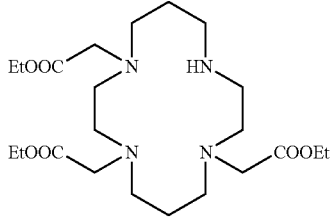

1,4,8-tris(ethoxycarbonylmethyl)-
1,4,8,11-tetraazacyclotetradecane
(TE3AE)

The functionalisation and hydrolysis/saponification operations have already been described above.

Whatever the process employed, the polypropylene fibres can be provided in the form of a nonwoven.

The peroxide and/or hydroperoxide functional groups may be prepared by irradiation of polypropylene fibres by electrons under an oxidising atmosphere, for example of air or of oxygen.

Generally, the polypropylene fibres are irradiated at a dose of 20 to 60 kGy, preferably of 40 kGy.

The invention additionally relates to a process for removing metal cations present (contained) in a liquid, in which the said liquid is brought into contact with the material according to the invention as described above.

The contacting operation is generally carried out at a temperature of 20 to 60° C., for example 50° C.

This process is advantageously carried out continuously, the material according to the invention being placed in a column through which a stream of the liquid to be treated passes.

This process preferably comprises, in addition, a step of regeneration of the material when the latter is saturated with the fixed metals.

The said metal cations are generally chosen from transition metals, heavy metals, metals from Group IIIA of the Periodic Table, lanthanides, actinides and alkaline earth metals, in particular from the U, Pu, Am, Ce, Eu, Al, Gd, Cr, Mn, Fe, Co, Ni, Cu, Zn, Ag, Cd, B, Au, Hg, Pb, As, Ca, Sr, Mg, Be, Ba and Ra cations.

The treated liquid is in particular an aqueous liquid, such as a radioactive aqueous effluent of low activity.

Such an effluent is, for example, the aqueous effluent of low activity resulting from the industrial evaporator of a plant for the treatment of the effluents from a nuclear installation.

As was specified above, one of the immediate applications of the materials according to the invention, namely of the macrocyclic, in particular tetranitrogenous, ligands grafted on (to) polypropylene fibres according to the invention, is their use in a solid-liquid extraction process for the purpose of treating effluents contaminated by heavy metals or radioelements.

The properties of the materials according to the invention allow them to be incorporated in a treatment process which meets an industrial need and which is not limited to laboratory applications.

A need is identified at the Commissariat à l'Energie Atomique [Atomic Energy Commission] (CEA) at Valduc for the use of the novel materials according to the invention in a process which is to become incorporated in the plant for the treatment of liquid effluents of this centre.

The CEA at Valduc observes very low discharge standards for its radioactive or nonradioactive liquid effluents; by way of example, the total activity of the radioactive effluents has to be less than 5 Bq/m$^3$ or the standard in force for the discharge of cadmium in nonradioactive waste waters is 5 ppb. These standards place the water treatment techniques in the range of ultrapurification. The effluents of low activity produced by the centre are currently treated by evaporation under reduced pressure in an industrial evaporator and then ultimately decontaminated by a microfiltration unit. The latter technique separates only the solid particles which are sufficiently large and does not make it possible to treat the occasional particular effluents for which the radioelements are found in a soluble form. For these exceptional cases, the effluents implicated are reinjected into the treatment circuit.

A process for solid-liquid extraction with the selective sequestering materials according to the invention is particularly suited to treating these effluents in which the contaminating elements occur in a soluble form. This is a complementary technique to those currently used at the Valduc centre. This technique can partially, indeed even completely, supplant the evaporation, which is a relatively cumbersome technique to employ and costly in energy. The possible incineration of the material according to the invention at the end of the lifetime is also a determining asset in the strategy of reducing wastes under way in the nuclear industries.

As regards the issue of cadmium and more generally that of heavy metals, in the case of the treatment of nonradioactive aqueous effluents comprising such metals, in particular in the case of accidental pollution, the incorporation of the novel materials according to the invention in a process is a response to a case of pollution, for example of a retention basin for aqueous effluents, and thus constitutes a novel immediate application for the use of these materials.

More generally, the possible applications for the materials according to the invention are their use in the treatment of liquid industrial effluents polluted by heavy metals, lanthanides or actinides. The selectivity for the targeted metals is provided by adjusting the functionalisation of the macrocyclic, for example tetranitrogenous, ligands.

A better understanding of the invention will be achieved on reading the detailed description which follows, made in connection with the appended drawings, in which:

FIG. 1 is a graph which shows the influence of the irradiation dose on the grafting of polychloromethylstyrene on (to) polypropylene fibres.

The chlorine content (mmol/g) is carried on the ordinate and the irradiation dose (in kGy) is carried on the abscissa.

The top curve (Batch No. 1) relates to pure chloromethylstyrene, with reaction for 16 hours at a temperature of 115° C., and the bottom curve (Batch No. 2) relates to 50% chloromethylstyrene in water, with reaction for 6 hours at a temperature of 100° C.

Figure 2:
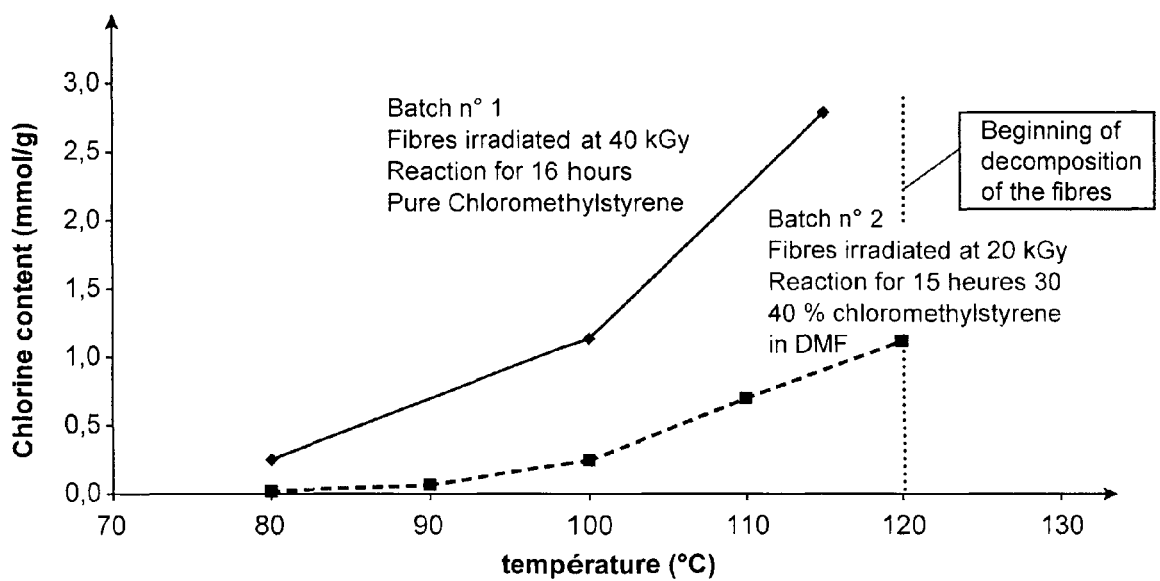
FIG. 2 shows the influence of temperature on grafting according to one embodiment of the invention.

FIG. 2 is a graph which shows the influence of the temperature on the grafting of polychloromethylstyrène on (to) polypropylene fibres.

The chlorine content (mmol/g) is plotted on the ordinate and the temperature (in ° C.) is plotted on the abscissa.

The top curve (Batch No. 1) relates to a process carried out with PP fibres irradiated at 40 kGy, with a reaction time of 16 hours and pure chloromethylstyrene, and the bottom curve (Batch No. 2) relates to a process carried out with fibres irradiated at 20 kGy, with a reaction time of 15 h 30 and 40% chloromethylstyrene in DMF; the vertical dotted line indicates the beginning of decomposition of the fibres.

Figure 3:
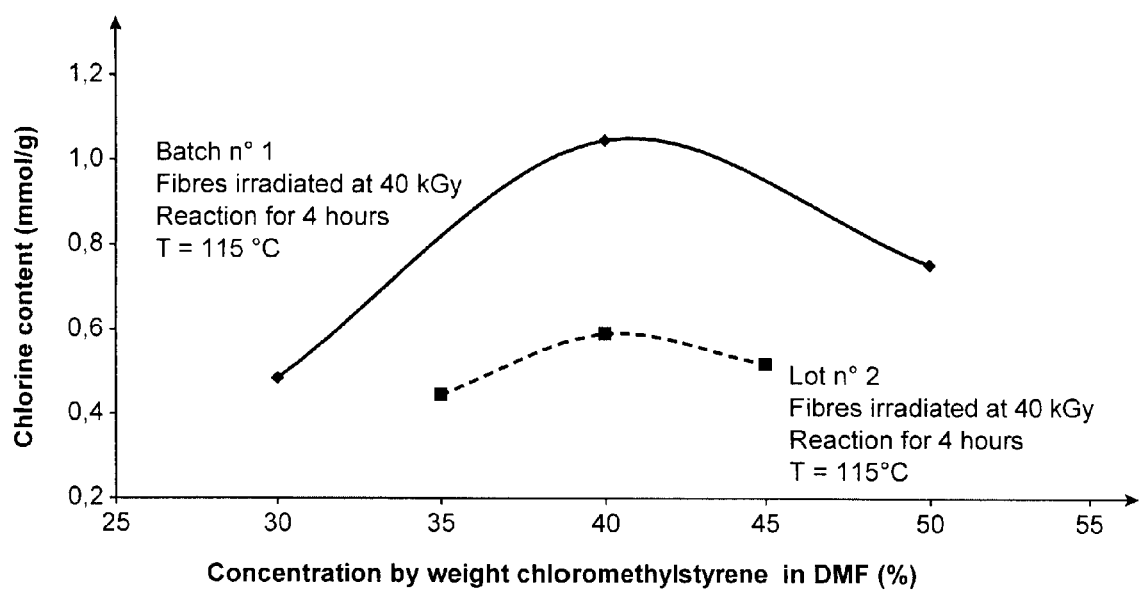
FIG. 3 shows the influence of concentration of the active materials on grafting according to one embodiment of the invention.

FIG. 3 is a graph which shows the influence of the concentration by weight (%) of chloromethylstyrene in solution in DMF on the grafting of polychloromethylstyrene to polypropylene fibres.

The chlorine content (mmol/g) is plotted on the ordinate and the concentration by weight of chloromethylstyrene in DMF (%) is plotted on the abscissa.

The top curve relates to fibres irradiated at 40 kGy (Batch No. 1) with a reaction time of 4 hours at a reaction temperature of 115° C.

The bottom curve also relates to fibres irradiated at 40 kGy (Batch No. 2) with a reaction time of 4 hours at a temperature of 115° C.

Figure 4:
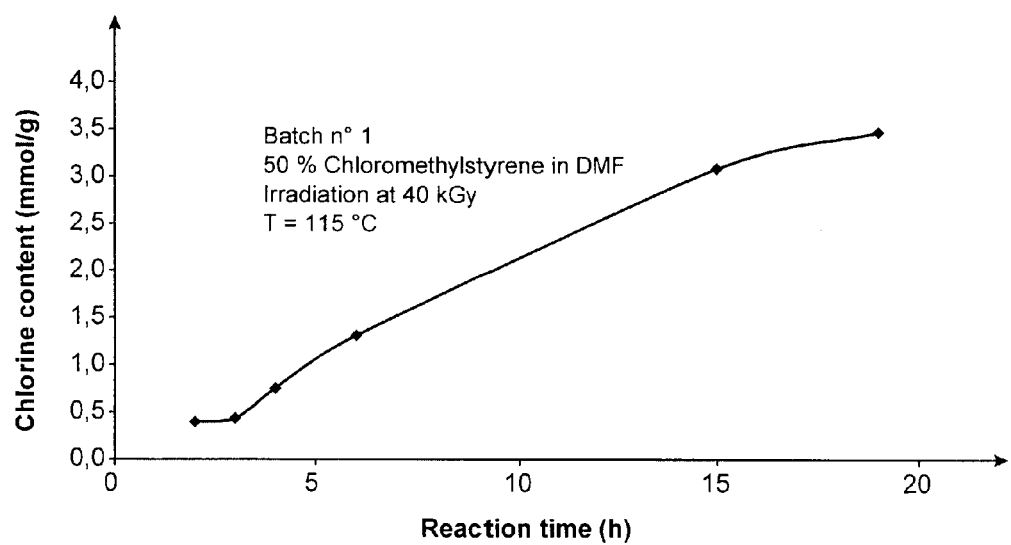
FIG. 4 shows the influence of reaction time on grafting according to one embodiment of the invention.

FIG. 4 is a graph which shows the influence of the reaction time on the grafting of polychloromethylstyrene on (to) polypropylene fibres.

The chlorine content (mmol/g) is plotted on the ordinate and the reaction time or duration (h) is plotted on the abscissa.

The curve presented relates to grafting carried out with polypropylene fibres irradiated at 40 kGy (Batch No. 1) and a 50% solution of chloromethylstyrene in DMF and at a temperature of 115° C.

Figure 5:
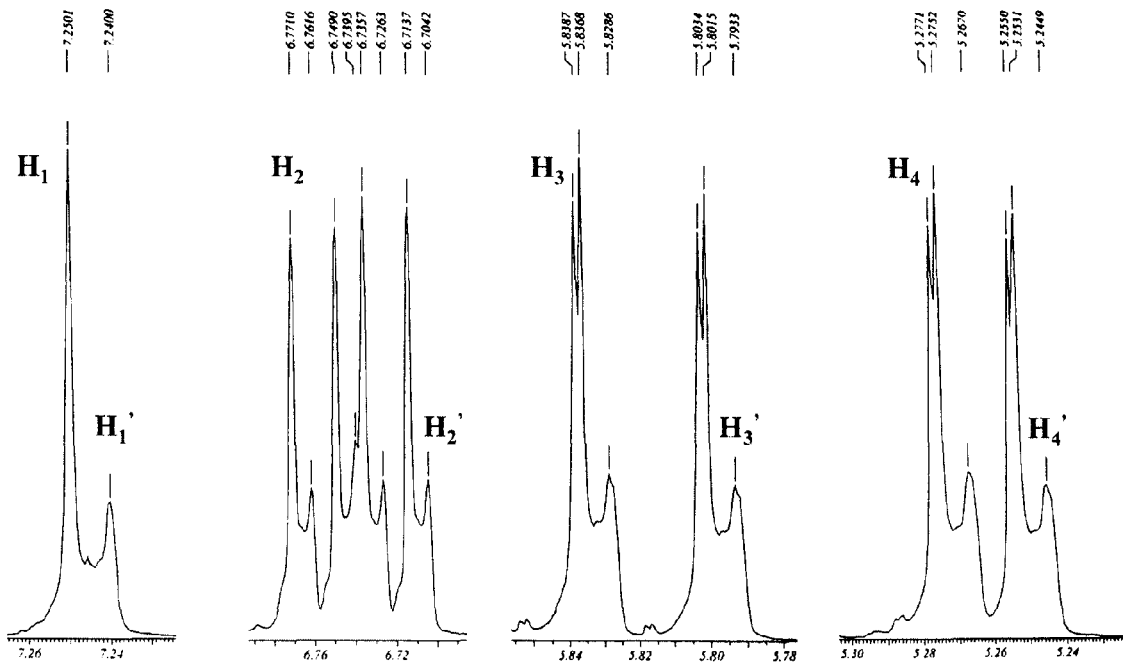
FIG. 5 shows an NMR spectrum of the complexomer of maleic anhydride and chloromethylstyrene according to one embodiment of the invention.

FIG. 5 is the expanded view of the $^1$H NMR spectrum (500 MHz, $(CD_3)CO$) of the complexomer between the maleic anhydride and the chloromethylstyrene (formed from an equimolar mixture of the two monomers brought to reflux of the deuterated acetone for 1 hour).

Figure 6:
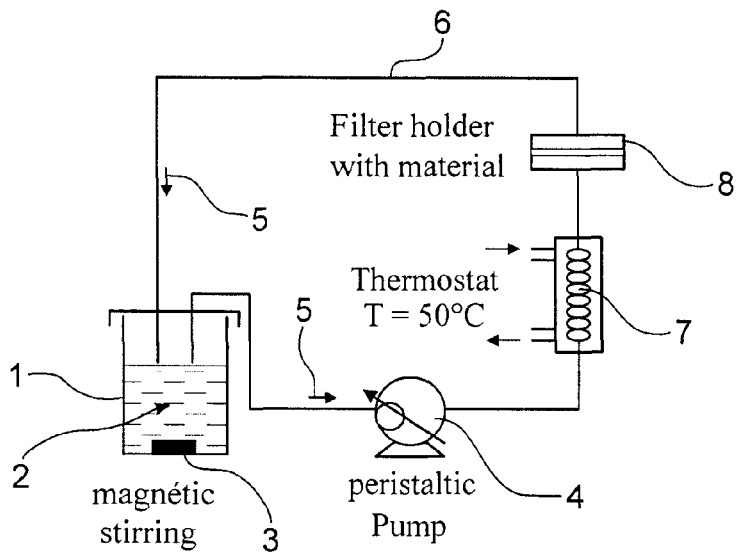
FIG. 6 shows a diagrammatic view of an experimental device for extraction testing.

FIG. 6 is a diagrammatic cross sectional side view of an experimental device used for solid-liquid extraction tests at equilibrium on the materials according to the invention and on the reference material.

The present invention describes the grafting of polyazamacrocyclic, in particular tetraazamacrocyclic, ligands on (to) polypropylene fibres.

One of the problems raised by the use of such a support is in particular its hydrophobicity. This characteristic can reduce the wettability of the support and thus be disadvantageous to the accessibility of the metal dissolved in the liquid to the complexing tetraazamacrocyclic molecule grafted on (to) the support. The grafting process according to the invention makes it possible in particular to defeat, thwart, this hydrophobicity of the material by introducing sufficient hydrophilic functional groups. The latter are concentrated close to the complexing reaction sites. The grafting process developed according to the invention also makes it possible to control the number of macrocyclic molecules attached to the surface of the material, which allows the number of sites for fixing pollutants, such as metal cations, to be adjusted according to the application selected for the material.

Examples of materials according to the invention are of the following type:

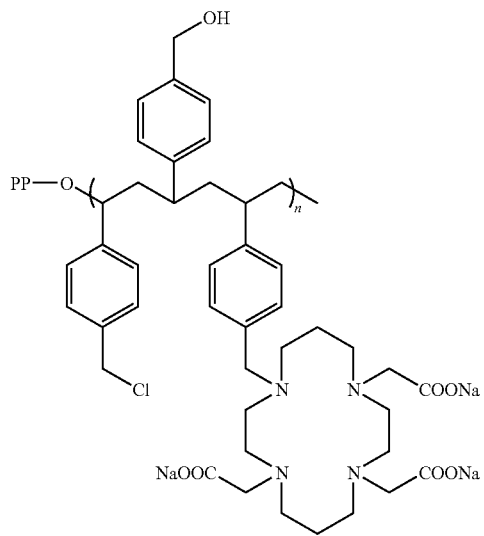

PP-ClSt-TE3A
with
PP: polypropylene fibers
ClSt: polychloromethylstyrene (spacer arm)
TE3A: tetranitrogenous macrocyclic ligand

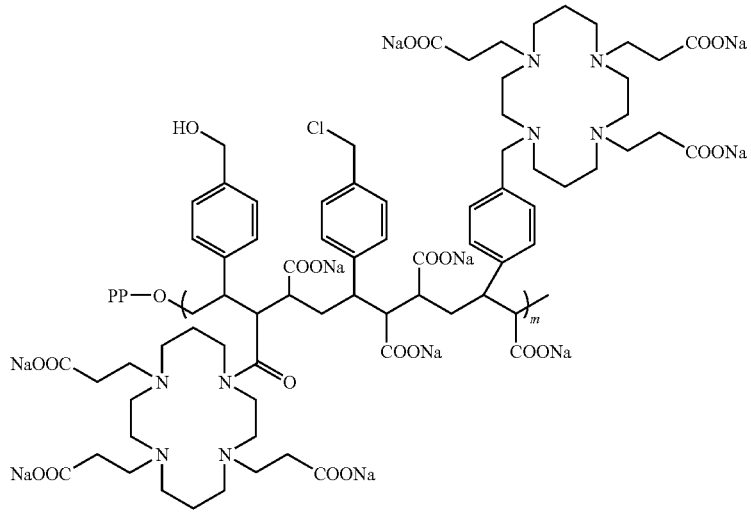

PP-MAnClSt-TE3P
with
PP: polypropylene fibers
MAnClSt: poly(maleic anhydride-alt-chloromethylstyrene) (spacer arm)
TE3P: tetranitrogenous macrocyclic ligand In these formulae, n and m are integers from 10 to 1000.

Preparation of the Novel Materials

The principle of the grafting of polyazamacrocyclic, in particular tetraazamacrocyclic, molecules to polypropylene according to the invention is based on a radical polymerisation reaction at the surface of the polypropylene.

The polymerisation reaction is initiated by radicals created following the heating of the preirradiated polypropylene fibres. The monomer employed to prepare the materials according to the invention, both in the first embodiment and in the second embodiment, has, for example, a unit of styrene type. Two routes for fixing polyazamacrocycles, for example tetraazamacrocycles, on (to) polypropylene, corresponding to the first and to the second embodiments of the materials and of the process according to the invention, have been developed:

"direct" grafting by polymerisation of the entity, for example of styrene type, carrying a macrocycle, for example a tetranitrogeneous macrocycle, grafting of a spacer arm by polymerisation of a functional monomer in the presence of polypropylene, followed by the coupling of the polyazamacrocycle, for example of the tetraazamacrocycle, on (to) the reactive functional group of the said monomer. Two spacer arms which are different in nature have in particular been grafted.

In that which follows, the various operations resulting in the novel materials prepared according to the invention are taken up in more detail.

In the description which follows, reference is made, in order to illustrate the materials and the process according to the invention, to specific compounds, reactive functional groups, implementational conditions, and the like. These compounds (for example polyazacycloalkane), functional groups or conditions are given only by way of illustration and do not in any way limit the invention as described above and in the claims.

A man skilled in the art can easily, from the description which follows, apply the invention to all possible compounds, conditions, reactive functional groups, and the like, the majority of which have been defined above.

Grafting Technique

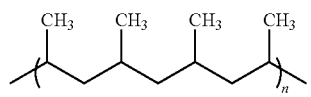

where n is generally an integer from 100 to 3000.

Molecular Structure of Polypropylene (PP)

The polypropylene fibres used as base material are generally in the form of a nonwoven and have been preirradiated, for example on a linear electronic accelerator under an atmosphere of air or of oxygen.

Irradiation under an atmosphere of air results in the formation of peroxides and/or hydroperoxides, predominantly on the tertiary carbon (see the molecular structure of polypropylene above). It is clearly evident that other techniques known to a man skilled in the art might be used to provide polypropylene with these peroxide and/or hydroperoxide functional groups. The hydroperoxides and peroxides are thermally decomposed (beyond 80° C.) and generate oxy radicals on the fibre, which radicals are initiators, in the presence of a monomer which may be polymerised under radical conditions, for example of a vinyl monomer, in the medium, of polymerisation at the surface of the fibre. It is known that various monomers which polymerise under radical conditions have been grafted by this technique: acrylonitrile[17], acrylate[34], acrylic acid[35-38], vinylpyridine[39, 40], vinylalkoxysilane[41], and the like.

Direct Grafting

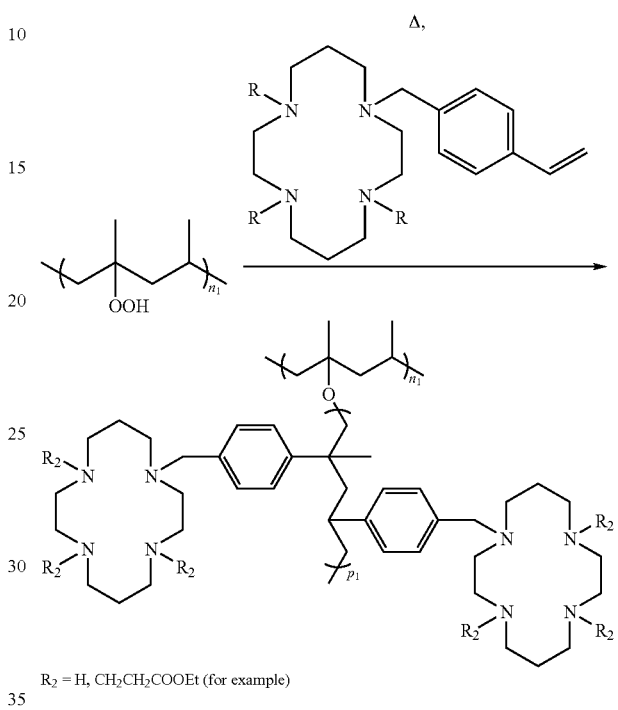

Scheme 1

$R_2 = H, CH_2CH_2COOEt$ (for example)

Two tetraazamacrocyclic monomers, N-(4-vinylbenzyl)cyclam and N,N',N''-tris(2-ethoxycarbonylethyl)-N'''-(4-vinylbenzyl)cyclam, were subjected, under absolutely identical conditions, to a polymerisation reaction at the surface of the polypropylene fibres. The content of macrocyclic ligand grafted is given in Table 1 below.

TABLE 1

Results of the "direct" grafting of macrocyclic ligands

Grafting of a spacer arm

Grafting of polychloromethylstyrene

| 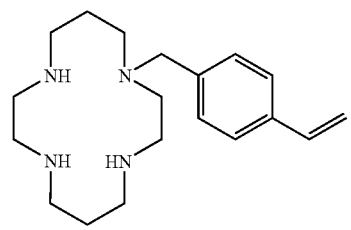 | 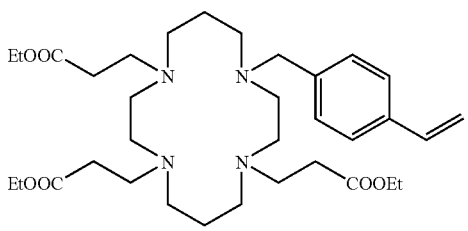 |
|---|---|
| N-(4-vinylbenzyl)cyclam | N,N',N''-tris(2-ethoxycarbonylethyl)-N'''-(4-vinylbenzyl)cyclam |
| Content of ligand (mmol/g)   0.20 | <0.05 |

The polymerisation of chloromethylstyrene at the surface of the polypropylene, represented diagrammatically below, results in a fibrous composite material referred to as PP-ClSt.

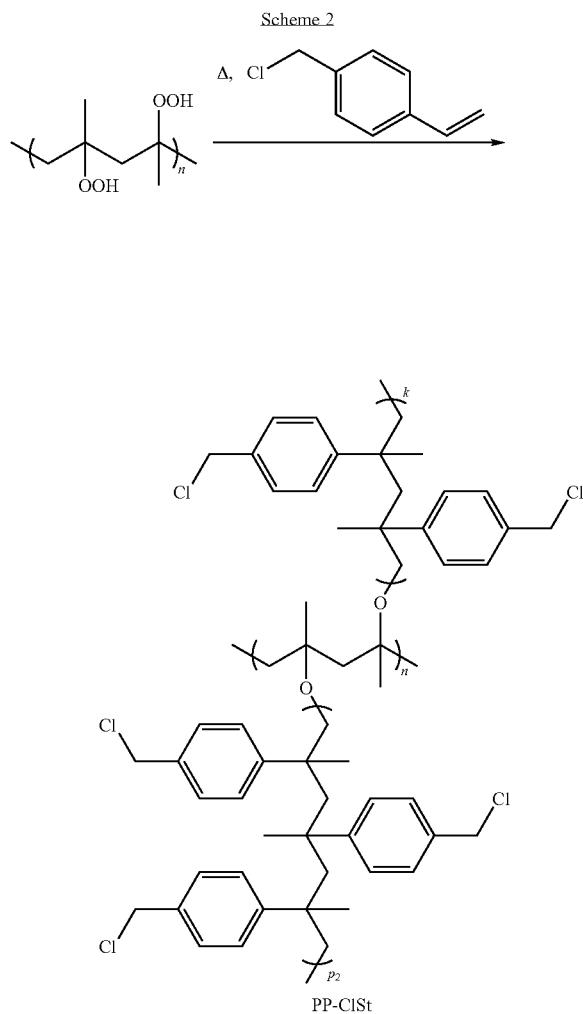

In Scheme 2, n is an integer from 100 to 3000 and k and $p_2$ are integers from 10 to 1000.

The chloromethyl functional group of the PP-ClSt fibre is subsequently capable of reacting, in a heterogeneous phase, with an amine functional group of the macrocyclic ligand. The content of macrocyclic molecules grafted is thus mainly governed by the polymerisation reaction of the chloromethylstyrene generally at the surface of the polypropylene. The polymerisation reaction is influenced by the conventional parameters involved in a polymerisation reaction: nature of the solvent, temperature, concentration of monomer, reaction time and concentration of the initiator.

One of the advantages of these materials (in general), in particular with respect to those prepared from silica, lies in the fact that it is possible to define and to adjust the number of complexing reaction sites which will be present on the material, this being done by controlling the degree of polymerisation during the grafting of the spacer arm.

The influence of the parameters listed above has been studied and the results obtained are reported in the examples given below (Example 1).

Parameters defined as optimal could thus be distinguished:

the solvent DMF (DiMethylFormamide), an irradiation dose of 40 kGy, a solution of monomer diluted to 40% in DMF, a temperature of 115° C., a reaction time of 10 hours (for a content of chloromethyl groups of the order of 2 mmol/g).

These optimal parameters were determined in order to guarantee the preparation of materials exhibiting a good compromise between a good degree of grafting and preservation of the integrity and properties of the polypropylene fibres.

However, the preparation of the materials according to the invention is not restricted to the sole and dominant application of the parameters emphasised above.

Grafting of poly(maleic anhydride-alt-chloromethylstyrene)

In order to introduce more carboxylate functional groups, which are hydrophilic functional groups which participate in the coordination of heavy metals, lanthanides and actinides, the formation of an alternating copolymer of maleic anhydride and chloromethylstyrene units grafted to the surface of the polypropylene fibres was carried out. The uniformity of the alternation between chloromethylstyrene unit and maleic anhydride unit is provided by the formation of a charge transfer complex between these two monomers, the demonstration of which by NMR spectroscopy is reported in Example 2 and FIG. 5. The charge transfer complex has the property of polymerising more easily than the isolated monomers.

The formation of an alternating copolymer of maleic anhydride and styrene units is described both in solution[42] and on various polymeric supports: cellulose[43], polyethylene film [44] and polyethylene in a molten medium[45]. Studies have also been carried out on polypropylene by chemical initiation with benzoyl peroxide[46] or by an ionising technique (ozonisation and γ irradiation)[47]. Starting from maleic anhydride, various CTCs were formed and demonstrated by UV and NMR spectroscopy by addition of styrene[48], vinyltriethoxysilane[49] or 1,4-dioxene[50]. On the other hand, the formation of a complexomer between maleic anhydride and chloromethylstyrene has never been mentioned to our knowledge.

The copolymerisation of maleic anhydride and chloromethylstyrene at the surface of the polypropylene, represented diagrammatically below, results in a fibrous composite material known as PP-MAnClSt.

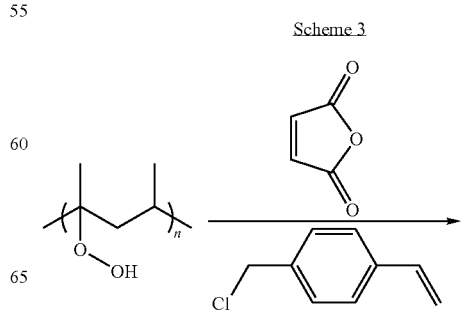

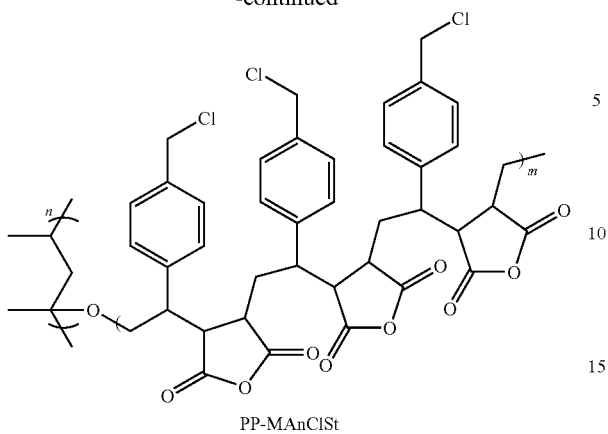

PP-MAnClSt

In Scheme 3, n is an integer from 10 to 3000 and m is an integer from 10 to 1000.

The influence on the degree of grafting of the parameters of solvent, temperature and reaction time was studied and is reported in Example 3. It is concluded therefrom that the reaction of grafting poly(maleic anhydride-alt-chloromethyl-styrene) on (to) polypropylene fibres is well controlled by using acetone as solvent for the reaction, a temperature of 90° C. (reaction under pressure) and a total composition of monomers equal to 30%. The degree of grafting is then controlled by the reaction time. The equimolar presence of the two monomers at the surface of the polypropylene fibres is also confirmed.

Coupling of Macrocyclic Ligands to the Precursor Materials

Synthesis of the Ligands

Two types of macrocyclic ligands were synthesised for the purpose of coupling on (to) the materials PP-ClSt and PP-MAnClSt:

nonfunctionalised ligands. Cyclam was prepared according to a protocol developed in the patent[51].

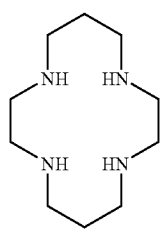

Molecular Structure of Cyclam ligands of acid type. They carry carboxylic acid functional groups or ester functional groups. The triester compounds are "intermediate ligands" used to promote the coupling of the ligands to the materials. After grafting, they are hydrolysed to give the corresponding carboxylic acid.

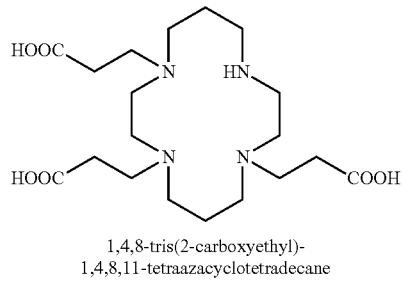

1,4,8-tris(2-carboxyethyl)-
1,4,8,11-tetraazacyclotetradecane

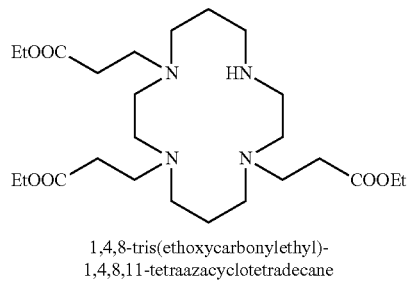

1,4,8-tris(ethoxycarbonylethyl)-
1,4,8,11-tetraazacyclotetradecane

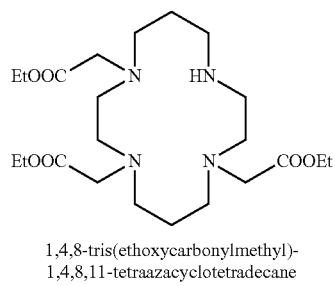

1,4,8-tris(ethoxycarbonylmethyl)-
1,4,8,11-tetraazacyclotetradecane

Molecular Structures of the Macrocyclic Precursors (TE: tetradecane, 3: number of arms, Pr: propionic acid, PE: ethyl propionate, AE: ethyl acetate).

Normally, tetraazamacrocycles trisubstituted by carboxylic acid arms are prepared according to the strategy: monoprotection of the cyclam with a benzyl group, functionalisation of the remaining three secondary amines and then cleavage of the benzyl group[52]. This synthesis requires several successive steps and associated purification steps.

The materials described in this invention are prepared with an objective of an industrial use, that is to say that they have to be produced in a large amount while limiting tedious operations (for example of purification). The new routes for the synthesis of the two macrocyclic ligands developed meet these criteria since the target molecules are obtained with a correct yield in a single step and without an operation which is difficult to implement industrially.

Thus, the cyclam trifunctionalised with acetate arms 2 was synthesised with a yield of 48% from cyclam using 3.2 equivalents of ethylbromoacetate (Scheme 4). The main by-product of the reaction, the tetrasubstituted compound 3, is separated from the reaction mixture by precipitation from ethanol. The other side products, the monosubstituted, disubstituted or quaternised compounds, are insoluble in pentane. The expected triester 2 is obtained by simple extraction in this solvent.

Scheme 4

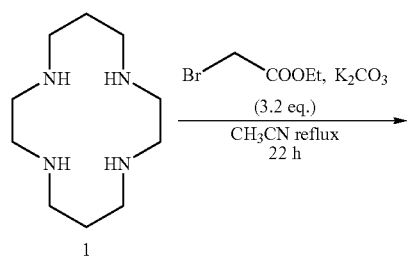

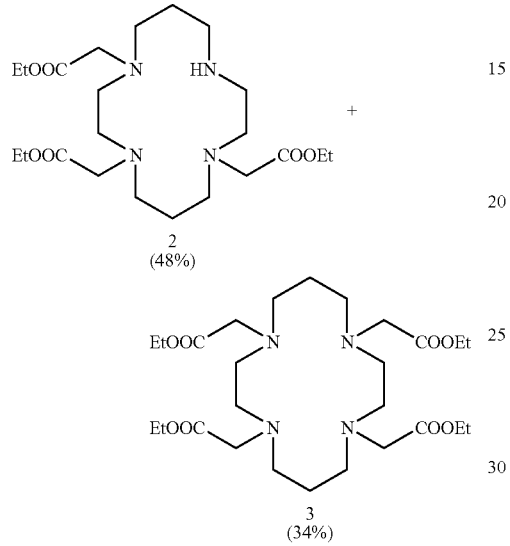

Likewise, the corresponding propionate ester product 4 was obtained with a yield of 75% by reaction of cyclam with an excess of ethyl acrylate in chloroform (Scheme 5). The reaction stops at the trifunctionalised compound, whereas substitution is complete in a solvent such as acetonitrile.

Scheme 5

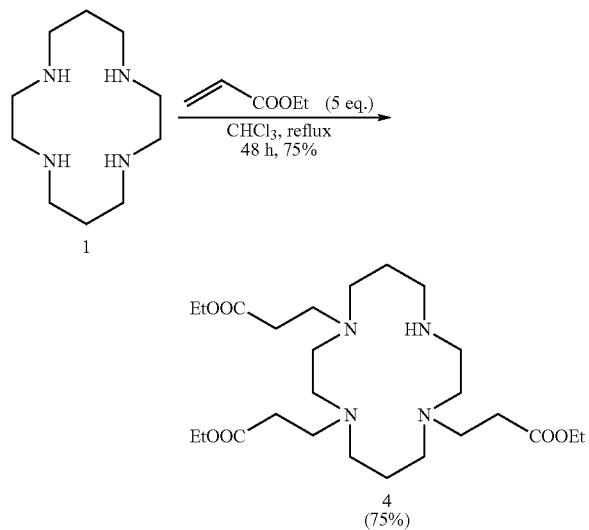

Coupling to (on) PP-ClSt

The immobilisation of the macrocyclic molecules on the PP-ClSt fibres proceeds by a nucleophilic substitution reaction between the functional groups, for example chloromethyl functional groups, of the substrate and the secondary amine functional group of the ligands. The grafting yield was calculated from the chlorine content of the precursor material and from the content of macrocycle fixed (elemental analysis of the nitrogen of the final material). It takes into account the increase in weight of the material upon the coupling of the ligand.

Coupling of a Nonfunctionalised Ligand: Cyclam

Scheme 6

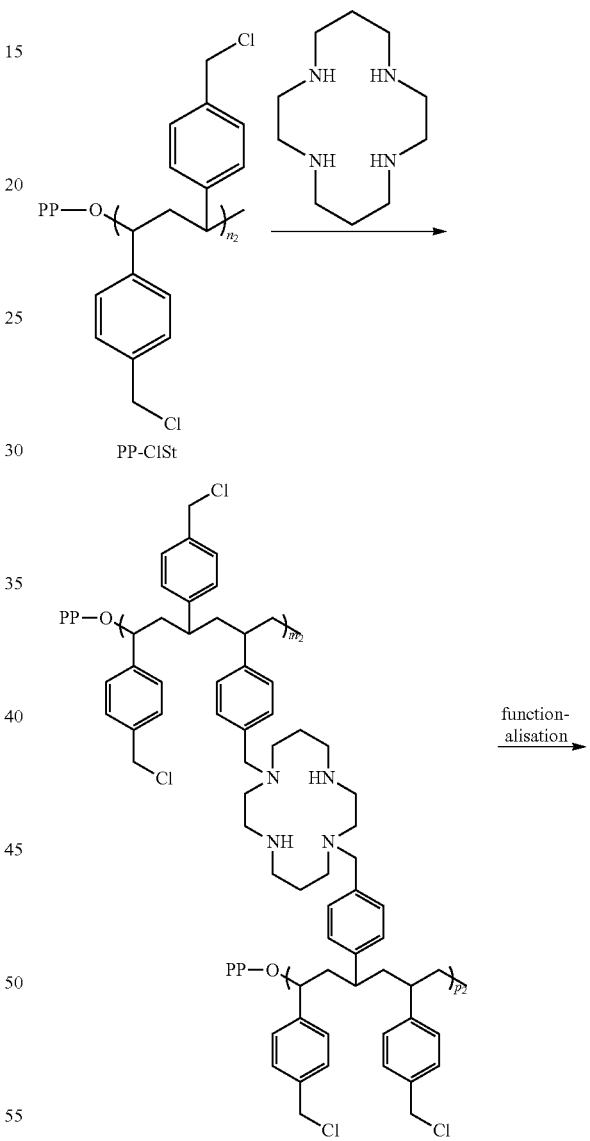

In Scheme 6, $n_2$, $p_2$ and $m_2$ are integers from 10 to 1000.

The materials prepared have a content of grafted cyclam varying between 0.2 mmol/g and 1.1 mmol/g, this value being directly related to the degree of polymerisation of the material PP-ClSt. The coupling results obtained show that, on average, the cyclam is bonded to the solid support via two covalent bonds (Scheme 6). This scheme can, of course, be generalised to any polyazacycloalkane. During the following functionalisation step, on average just one coordinating functional group (of two possible) is introduced.

In this functionalisation step, one or more of the free amine functional groups, for example, is/are substituted by an $R_2$ group other than a hydrogen defined above.

The silica-based reference material is prepared according to a similar scheme with postfunctionalisation of the ligand, after grafting on (to) the material. In this case too, only one to two complexing carboxylate functional groups are present per ligand.

Coupling of Trifunctionalised Ligands

The coupling of trifunctionalised ligands guarantees, in contrast, that three coordinating carboxylate functional groups are systematically present per macrocyclic molecule fixed to the material, which is a guarantee of more efficient scavenging of heavy metals, lanthanides and actinides.

Scheme 7

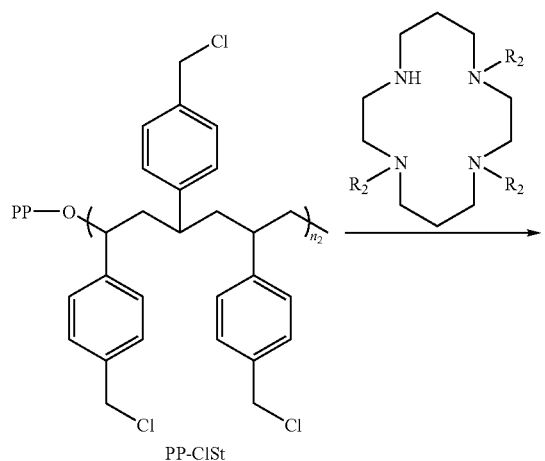

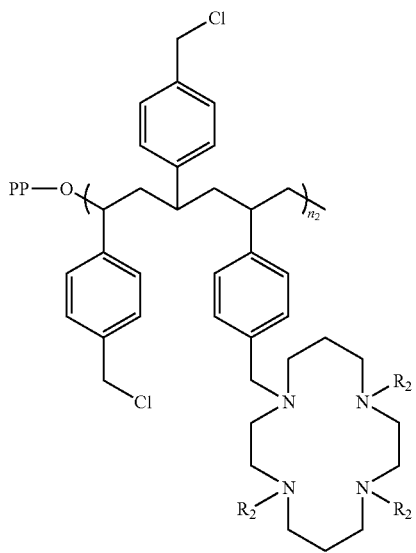

$R_2 = $ —$(CH_2)_2COONa$; —$CH_2COOEt$; —$(CH_2)_2COOEt$

In Scheme 7, $n_2$ is an integer from 10 to 1000.

Coupling of the N,N',N''-tris(2-sodiooxycarbonyl-ethyl)cyclam ligand ($R_2$+$(CH_2)_2COONa$)

This reaction (Scheme 7) is carried out in water and results in true, although slight, grafting. The coupling of cyclam in an organic solvent (acetonitrile), under identical operating conditions, is thus comparatively much greater (Table 2).

TABLE 2

Comparison of the fixing of cyclam (in acetonitrile) and the sodium salt of TE3Pr (4) (in water) on (to) three PP-ClSt materials (concentration of the ligand: 50 mmol/l, T = 75° C., reaction for 60 h).

| | | Chlorine content on PP-ClSt (mmol/g) | |
|---|---|---|---|
| | Material 1 0.48 | Material 2 0.93 | Material 3 1.31 |
| Ligand content on the grafted material (mmol/g) 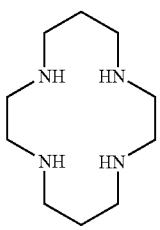 [SMILES: C1CNCCNCCCNCCNC1] | 0.22 | 0.39 | 0.44 |
| 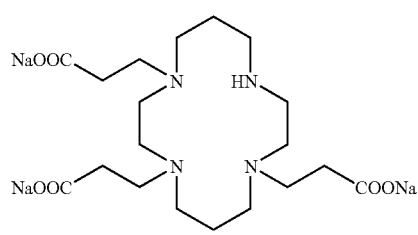 | 0.04 | 0.17 | 0.16 |

Coupling of the N,N',N"-tris(methoxycarbonyl-ethyl)cyclam (TE3AE) (R₂+CH₂COOEt) and N,N',N"-tris-(ethoxycarbonylethyl)cyclam (TE3PE) (R₂+(CH₂)₂COOEt) ligands The coupling of the triesters TE3AE (2) and TE3PE (4) on (to) PP-ClSt is carried out in an organic medium, in acetonitrile (Scheme 7). This scheme can be generalised to any polyazacycloalkane. The contents of grafted ligand are dependent on the content of chloromethyl groups present on the PP-ClSt but also on the excess ligand used for the coupling reaction (Table 3). The yield of the grafting increases with the excess macrocycle employed for the reaction. However, a limit, attributed to steric hindrance, in the efficiency of the coupling was observed at approximately 50%.

TABLE 3

Yield of the grafting of TE3AE and TE3PE to various PP-ClSt materials.

| Ligand | Content of chloromethyl functional groups (mmol/g) | Content of ligand (mmol/g) | Yield of the grafting (%) | Excess ligand/ chloromethylstyrene |
|---|---|---|---|---|
| 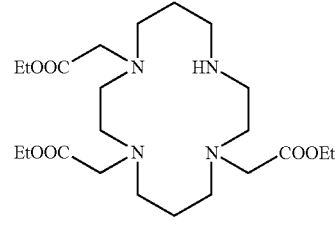 TE3AE | 1.90 | 0.69 | 53 | 7 |
| | 1.31 | 0.46 | 43 | 6 |
| | 2.30 | 0.81 | 53 | 5 |
| | 2.30 | 0.54 | 33 | 4 |
| | 1.00 | 0.28 | 28 | 3 |
| | 0.60 | 0.14 | 24 | 3 |
| 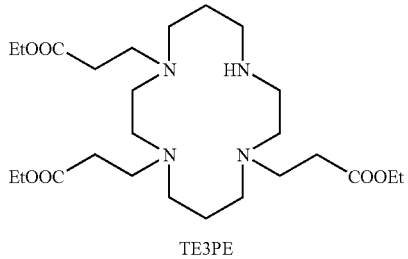 TE3PE | 2.30 | 0.88 | 50 | 9 |
| | 1.90 | 0.81 | 63 | 7 |
| | 1.31 | 0.54 | 51 | 7 |
| | 1.73 | 0.53 | 40 | 6 |
| | 0.60 | 0.22 | 35 | 3 |
| | 0.75 | 0.25 | 38 | 3 |

In a second step, the coordinating carboxylic acid functional groups are generated by saponification of the ester groups of the macrocyclic ligands in the presence of sodium hydroxide in a water/alcohol medium. This stage simultaneously results in hydroxylation of a large part (approximately 75%) of the residual chlorinated endings, thus greatly increasing the hydrophilicity and the wettability of the grafted fibres. The intrinsic hydrophobicity of the polypropylene fibres is thus counterbalanced by the introduction of a sizeable number of hydrophilic functional groups: the hydroxyl endings and the carboxylate functional groups of the ligand.

Coupling to (on) PP-MAnClSt

The grafting on (to) the PP-MAnClSt materials was limited to the coupling of the TE3PE and TE3AE ligands. The maximum content of grafted macrocycle is 0.6 mmol/g.

Of the two possible reactions for coupling a secondary amine on (to) the PP-MAnClSt material, that is to say a nucleophilic substitution reaction on the carbon atom bonded to the chlorine atom or a condensation on the maleic anhydride with creation of an amide functional group, it was shown that, for two thirds, the ligand is immobilised by the second route.

The following step of saponification of the ester groups of the immobilised ligand is accompanied, as above, by the hydroxylation of a large part (75%) of the residual chloromethyl functional groups of the material. It should be pointed out that the operating conditions employed (reaction at 40° C. for 18 h with 0.5N sodium hydroxide solution) make possible complete hydrolysis of the ester functional groups, whereas a very partial hydrolysis of the amide functional groups is observed: the macrocyclic ligand remains fixed at 85%.

The invention will now be described with reference to the following examples, given by way of illustration and without implied limitation.

EXAMPLE 1

Influence of various parameters on the grafting of polychlorométhylstyrène on (to) polypropylene fibres In this example, the influence of various parameters on the grafting of polychloromethylstyrene on (to) polypropylene fibres is studied.

These polypropylene fibres are in the form of a nonwoven and were supplied after irradiation by the Institut Francais du Textile et de L'Habillement [French Textile and Clothing Institute].

It should first of all be noted that the quality of the grafting may be evaluated either by elemental analysis of the chlorine atom or by determination of the increase in weight of the material during the grafting. These two evaluations are in agreement when the fibre is not decomposed during the grafting (loss in weight). The grafting results given below are expressed, by choice, as a function of the chlorine content.

1A. Choice of the Solvent

Various studies mention the use of solvents, such as methanol[56], water[57, 58] or the water-methanol (1-1) mixture[39], for grafting styrene on (to) polypropylene.

In addition to the solvents described above for the polymerisation of polystyrene on polypropylene, the solvents toluene and N,N-dimethylformamide (DMF) were tested for the polymerisation of chloromethylstyrene at the surface of polypropylene fibres.

The latter solvent (DMF) leads to the best results since it provides good homogeneity in the grafting, makes it possible to dissolve the side product, namely the homopolymer, and does not promote decomposition of the material.

DMF appears to be an appropriate solvent for this reaction.

1B. Influence of the Irradiation Dose

The irradiation dose reflects the energy of the radiation received by the material.

The polypropylene fibres studied were irradiated at three different doses: 20 kGy, 40 kGy and 60 kGy (1 Gy=1 J.kg$^{-1}$).

The results obtained (FIG. 1) show a greater amount of polychloromethylstyrene grafted for high irradiation doses. However, at 60 kGy, the fibres partially dissolve in the medium, a consequence of the shortening of the polypropylene chains by a splitting reaction. The influence of the irradiation, although detectable, remains limited, however, and is greatly alleviated after subsequent coupling of the macrocycle on (to) the PP-ClSt material.

A 40 kGy irradiation dose appears optimal for retaining the integrity of the fibre while providing an acceptable degree of grafting.

1C. Influence of the Temperature

The temperature plays a part in the decomposition of the peroxide bonds with the formation of oxo radicals. Its increase causes an increase in the number of sites for initiating the radical polymerisation and consequently brings about an increase in the amount of polychloromethylstyrene grafted (FIG. 2).

However, there exists a temperature limit set by the beginning of solubilization of the polypropylene in the reaction medium. Up to 120° C., the fibre is not decomposed for a reaction time of 16 h, when the chloromethylstyrene is diluted to 40% in DMF.

The reaction temperature will thus be restricted to 115° C.

1D. Influence of the Concentration of Chloromethyl-Styrene in DMF

The study of the influence of the concentration of monomer, over the 30-50% range of chloromethylstyrene in DMF, showed optimum grafting on (to) the polypropylene for a chloromethylstyrene concentration in the vicinity of 40% (FIG. 3). This passage through a maximum is mentioned by numerous teams for different systems: the maximum is reached at 55% for acrylic acid in water[36], 40% for methyl methacrylate in the methanol-decalin mixture[34], 40% for styrene in water[39] and 25% for styrene in methanol[56].

A proportion of 40% of chloromethylstyrene in DMF is thus optimal for the polymerisation reaction of this monomer at the surface of the polypropylene.

1E. Influence of the Reaction Time

This reaction is characterised by a latency time before the polymerisation begins. It corresponds to the period necessary to bring the fibres to temperature and for consumption of the stabilisers of the monomer (FIG. 4).

Control of the reaction time makes it possible to control the amount of chloromethyl groups fixed to the polypropylene fibres and consequently the content of macrocyclic ligands subsequently anchored on (to) the material. The objective is not to achieve maximum immobilisation of macrocyclic ligands as this would result in the structure of the material becoming strongly modified and in the fibres losing the starting properties.

Consequently, a reaction time of approximately 10 hours (about 2 mmol/g of chloromethyl functional groups) appears to be a good compromise between sizeable grafting and preservation of the characteristics of the support.

EXAMPLE 2

Formation of a Charge Transfer Complex Between Maleic Anhydride and Chloromethylstyrene The formation in solution of a charge transfer complex between maleic anhydride and chloromethylstyrene was demonstrated by NMR spectroscopy (FIG. 5). After stirring the two reactants for one hour at reflux of the acetone, the NMR spectrum of the reaction medium shows the presence of new ethylenic signals shielded with respect to those of the corresponding free monomers.

The equilibrium of this reaction (Scheme 8) is shifted towards the free monomers; however, the not insignificant amount of the complexomer and also the favoured polymerisation thereof makes it possible to achieve the grafting at the surface of the polypropylene of an alternating copolymer.

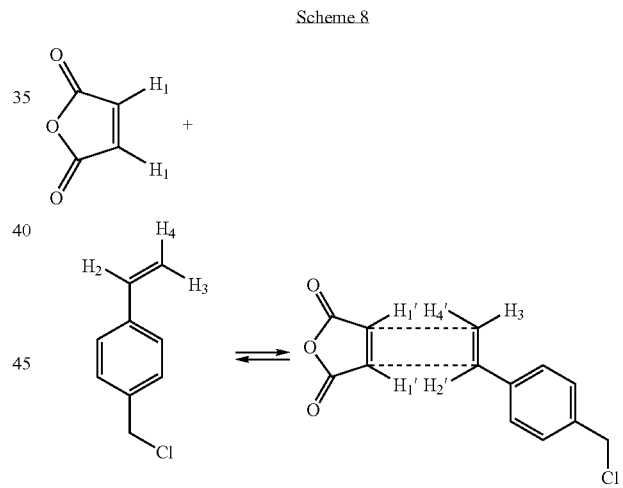

Scheme 8

EXAMPLE 3

Influence of Various Parameters on the Grafting of poly(maleic anhydride-alt-chloromethylstyrene) to polypropylene fibres In this example, the influence of various parameters on the grafting of poly(maleic anhydride-alt-chloromethylstyrene) on (to) polypropylene fibres is studied.

The results of the grafting of poly(maleic anhydride-alt-chloromethylstyrene) on (to) polypropylene fibres, expressed in terms of increase in weight, are described below for different operating conditions.

TABLE 4

Study of the grafting of poly(maleic anhydride-alt-chloromethylstyrene).

| Solvent | Temperature (° C.) | Reaction time (h) | Increase in weight (%) |
|---|---|---|---|
| Toluene | 90 | 14 | 82 |
|  | 95 | 4 | 25 |
| Acetone | 75 | 14 | 1 |
|  | 90 | 5.5 | 3 |
|  | 90 | 17 | 32 |
|  | 90 | 30 | 83 |

Polymerisation does not take place in DMF; it is faster in toluene than in acetone. However, as acetone dissolves the two monomers and the homocopolymer, unlike toluene, it is preferred as solvent for the reaction. The homogeneity of the grafting is then guaranteed.

The fixing of each monomer on (to) the polypropylene is confirmed qualitatively by infrared spectroscopy and quantitatively by microanalysis of the elements chlorine and oxygen. For an increase in weight of 32%, the amounts of grafted maleic anhydride and grafted chloromethylstyrene are each 0.97 mmol/g, assuming the uniform sequence of the two monomers (Table 5). The experimental results (1.03 mmol/g of maleic anhydride and 0.94 mmol/g of chloromethylstyrene) confirm the alternation of the two monomers in the copolymer, thus validating the polymerisation of the charge transfer complex at the surface of the polypropylene.

TABLE 5

Amount of maleic anhydride and chloromethylstyrene grafted on (to) PP-MAnClSt, determined from the increase in weight and from the elemental analysis of chlorine and oxygen

|  | Amount of monomers grafted (mmol/g) | |
|---|---|---|
|  | Maleic anhydride | Chloromethylstyrene |
| Increase in weight 32% | 0.97 | 0.97 |
| Elemental analysis % Cl = 3.65 | 1.03 | — |
| Elemental analysis % O = 4.52 | — | 0.94 |

In the following Examples 4 and 5, a description is given of the synthesis of the macrocyclic ligands used for the grafting on (to) polypropylene fibres in accordance with the invention.

EXAMPLE 4

Preparation of Ligands Used for the Direct Grafting

EXAMPLE 4A

Preparation of 1-(4-vinylbenzyl)-1,4,8,11-tetraazacyclotetradecane

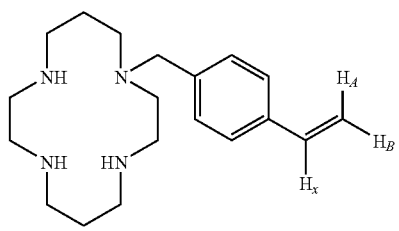

$C_{19}H_{32}N_4$
M.W. = 316.49 g. mol$^{-1}$ 40 g of cyclam (1) (200 mmol) are dissolved in 1 L of DMF at 70° C. 25 g (181 mmol) of potassium carbonate are added to the solution. A solution of 5.9 g (38.7 mmol) of chloromethylstyrene in 500 ml of DMF is added by slow dropwise addition (9 hours) with stirring. The reaction medium is stirred at 70° C. for an additional hour. After returning to ambient temperature, the excess cyclam and potassium carbonate is removed by filtration. The filtrate is evaporated and the residue is then taken up in diethyl ether. After evaporating the solvent, the compound is obtained in the form of a light yellow oil (11.2 g; 35.4 mmol). Yield: 91%.

$^1$H NMR (200 MHz; CDCl$_3$) δ (ppm): 1.52 (m, 2H, CH$_2$-β); 1.69 (m, 2H, CH$_2$-β); 2.2-2.7 (broad unresolved peak, 16H, CH$_2$-α); 3.40 (s, 2H, CH$_2$-φ); 5.06 (d, J$_{BX}$=11.0 Hz, 1H, H$_B$); 5.54 (d, J$_{AX}$=17.6 Hz, 1H, H$_A$); 6.52 (dd, J$_{Bx}$=11.0 Hz, J$_{AX}$=17.6 Hz, 1H, H$_X$); 7.1-7.2 (broad unresolved peak, 4H, H—Ar).

$^{13}$C NMR (50 MHz; CDCl$_3$) δ (ppm): 26.3; 28.7 (CH$_2$-β); 47.5; 48.0; 49.0; 49.1; 49.3; 50.8; 53.2; 54.7 (CH$_2$-α); 57.5 (CH$_2$-φ); 113.3 (=CH$_2$); 126.0; 129.3 (CH—Ar); 136.2 (C—Ar); 136.7 (φ-CH=); 138.4 (C—Ar).

Mass spectrometry (MALDI/TOF): m/z=316.88 (M$^{+●}$)

EXAMPLE 4B

Preparation of 1-(4-vinylbenzyl)-1,4,8-tris(ethoxycarbonylethyl)-1,4,8,11-tetraazacyclotetradecane

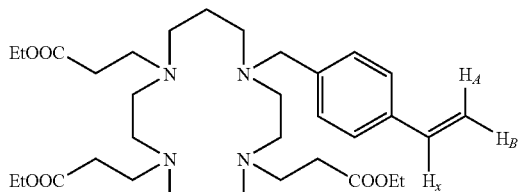

$C_{34}H_{56}O_6N_4$
M.W. = 616.85 g. mol$^{-1}$ 15.0 g (47.4 mmol) of the compound prepared in example 2A are dissolved in 700 ml of ethanol. 72.0 g (720 mmol) of ethyl acrylate in 400 ml of ethanol are added by rapid dropwise addition (duration of the addition: 1 hour) with stirring. The reaction medium is brought to reflux of the ethanol for 43 hours. After evaporating the ethanol, the residue is taken up in 100 ml of pentane. The solvent is evaporated and the compound is purified on a column of alumina (eluent: ethyl acetate:hexane 50:50). The compound is obtained in the form of a light yellow oil (25.1 g; 40.7 mmol). Yield: 86%.

$^1$H NMR (200 MHz; CDCl$_3$) δ (ppm): 1.18 (t, J=7.1 Hz, 3H, C$\underline{H}_3$—CH$_2$); 1.20 (t, J=7.1 Hz, 3H, C$\underline{H}_3$—CH$_2$); 1.22 (t, J=7.1 Hz, 3H, C$\underline{H}_3$—CH$_2$); 1.56 (m, 4H, CH$_2$-β); 2.3-2.5 (broad unresolved peak, 22H, CH$_2$-α); 2.6-2.8 (broad unresolved peak, 6H, CH$_2$—CO); 3.45 (s, 2H, CH$_2$-φ); 4.04 (q, J=7.1 Hz, 2H, CH$_3$—C$\underline{H}_2$); 4.06 (q, J=7.1 Hz, 2H, CH$_3$—C$\underline{H}_2$); 4.09 (q, J=7.1 Hz, 2H, CH$_3$—C$\underline{H}_2$); 5.16 (dd, 1H, J$_{AB}$=1.0 Hz, J$_{BX}$=11.0 Hz, H$_B$); 5.68 (dd, 1H, J$_{AB}$=1.0 Hz, J$_{AX}$=17.6 Hz, H$_A$); 6.66 (dd, 1H, J$_{BX}$=11.0 Hz, J$_{AX}$=17.6 Hz, H$_X$); 7.2-7.3 (broad unresolved peak, 4H, H—Ar).

$^{13}$C NMR (50 MHz; CDCl$_3$) δ (ppm): 14.3 (3C)(C$\underline{H}_3$—CH$_2$); 23.7; 24.1 (CH$_2$-β); 32.6; 32.7 (2C)(C$\underline{H}_2$-CO); 50.6 (4C); 51.2 (4C); 51.4 (3C) (CH$_2$-α); 59.4 (CH$_2$-φ); 60.4 (3C)(CH$_3$—C$\underline{H}_2$); 113.3 (=CH$_2$); 129.0; 129.1 (CH—Ar); 136.2 (C—Ar); 136.8 (φ-CH=); 139.8 (C—Ar); 172.9 (3C) (C=O).

Mass spectrometry (MALDI/TOF): m/z=616.83 (M$^{+•}$).

Elemental analysis: Calculated: C: 66.23; H, 9.09; N, 9.09. Found: C: 66.42; H, 9.11; N, 9.13.

EXAMPLE 5

Preparation of Ligands Used for the Two-Step Grafting

EXAMPLE 5A

Preparation of 1,4,8-tris(ethoxycarbonylmethyl)-1,4,8,11-tetraazacyclotetradecane 2

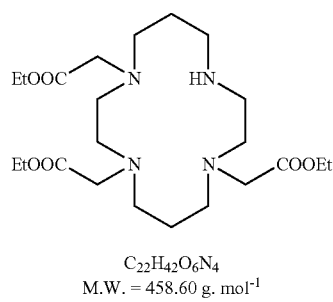 [SMILES: CCOC(=O)CN1CCCN(CC(=O)OCC)CCN(CC(=O)OCC)CCCNCC1]

C$_{22}$H$_{42}$O$_6$N$_4$
M.W. = 458.60 g. mol$^{-1}$ 5 g (25 mmol) of cyclam are dissolved in 400 ml of acetonitrile in the presence of 15 g (109 mmol) of potassium carbonate. 8 g (80 mmol) of ethyl bromoacetate are added by rapid dropwise addition. The reaction medium is brought to reflux of acetonitrile for 22 hours. The excess potassium carbonate is filtered off and the solvent is evaporated. The addition of 100 ml of ethanol to the residue brings about the precipitation of a white solid. After filtering and drying, 4.57 g of compound 3 are isolated. The filtrate is evaporated and the residue is then taken up in 50 ml of pentane. After evaporating the solvent, the compound 2 is obtained in the form of a colourless oil (5.50 g; 12.0 mmol). Yield 48%.

The product can be purified on a column of alumina (eluent: dichloromethane:methanol from 99:1 to 95:5).

$^1$H NMR (300 MHz; CDCl$_3$) δ (ppm): 1.17 (t, J=7.1 Hz, 3H, C$\underline{H}_3$—CH$_2$); 1.19 (t, J=7.1 Hz, 3H, C$\underline{H}_3$—CH$_2$); 1.20 (t, J=7.1 Hz, 3H, C$\underline{H}_3$—CH$_2$); 1.53 (m, 2H, CH$_2$-β); 1.64 (m, 2H, CH$_2$-β); 2.5-2.8 (broad unresolved peak, 17H, CH$_2$-α and NH); 3.27 (s, 2H, CH$_2$—CO); 3.28 (s, 2H, CH$_2$—CO); 3.32 (s, 2H, CH$_2$—CO); 4.05 (q, J=7.1 Hz, 2H, CH$_3$—C$\underline{H}_2$); 4.06 (q, J=7.1 Hz, 2H, CH$_3$—C$\underline{H}_2$); 4.07 (q, J=7.1 Hz, 2H, CH$_3$—C$\underline{H}_2$).

$^{13}$C NMR (75 MHz; CDCl$_3$) δ (ppm): 14.6 (3C)(C$\underline{H}_3$—CH$_2$); 25.5; 26.3 (CH$_2$-β); 47.7; 47.8; 48.8; 50.0; 50.4; 51.8; 52.6; 53.8; 53.9; 54.1; 55.6 (CH$_2$-α); 60.1; 60.2 (2C) (CH$_3$—C$\underline{H}_2$); 171.5; 171.6; 171.7 (C=O).

IR spectroscopy (KBr, cm$^{-1}$): 1736 ν(C=O).

Mass spectrometry (MALDI/TOF): m/z=457.95 (M$^{+•}$).

Elemental analysis: 2.2H$_2$O Calculated: C, 53.64; H, 9.00; N, 11.37. Found: C, 53.48; H, 8.81; N, 11.40.

EXAMPLE 5B

Preparation of 1,4,8,11-tetra(ethoxycarbonylmethyl)-1,4,8,11-tetraazacyclotetradecane 3

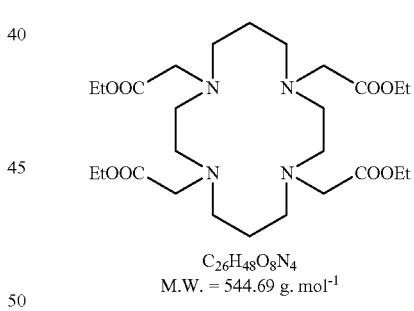

C$_{26}$H$_{48}$O$_8$N$_4$
M.W. = 544.69 g. mol$^{-1}$

This compound is a side product of the synthesis of compound 2. Yield 34%.

$^1$H NMR (500 MHz; CDCl$_3$) δ (ppm): 1.23 (t, J=7.1 Hz, 12H, C$\underline{H}_3$—CH$_2$); 1.59 (qt, 4H, J=6.6 Hz, CH$_2$-β); 2.68 (t, 8H, J=6.6 Hz, CH$_2$-α); 2.72 (s, 8H, CH$_2$-α); 3.34 (s, 8H, CH$_2$—CO); 4.12 (q, J=7.1 Hz, 8H, CH$_3$—C$\underline{H}_2$).

$^{13}$C NMR (125 MHz; CDCl$_3$) δ (ppm): 14.8 (C$\underline{H}_3$—CH$_2$); 25.8 (CH$_2$-β); 51.5; 51.6 (CH$_2$-α); 55.9 (C$\underline{H}_2$—CO); 60.6 (CH$_3$—C$\underline{H}_2$); 172.1 (C=O).

IR spectroscopy (KBr, cm$^{-1}$): 1729 ν(C=O).

Mass spectrometry (MALDI/TOF): m/z=544.99 (M$^{+•}$).

Elemental analysis: 3.2H$_2$O Calculated: C, 57.33; H, 8.88; N, 10.29. Found: C, 57.03; H, 8.92; N, 10.24.

EXAMPLE 5C 1,4,8-Tris(ethoxycarbonylethyl)-1,4,8,11-tetraazacyclotetradecane 4

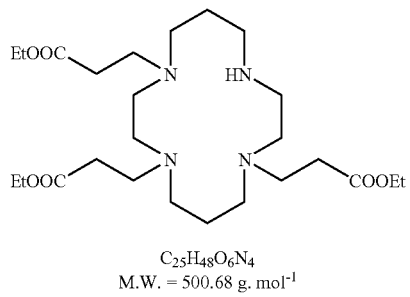 [SMILES: CCOC(=O)CCN1CCCN(CCC(=O)OCC)CCN(CCC(=O)OCC)CCCNCC1]

C$_{25}$H$_{48}$O$_6$N$_4$
M.W. = 500.68 g. mol$^{-1}$ 16.2 g (81 mmol) of cyclam (1) are dissolved in 1.3 L of chloroform at reflux. 40 g (400 mmol) of ethyl acrylate are added. After refluxing for 48 hours, the chloroform is evaporated and then the residue is taken up in 200 mL of pentane. Evaporation results in 30.3 g (60.5 mmol) of a slightly yellow oil being obtained. Crude yield 75%.

The product can be purified on a column of silica by gradual elution from 89:1:10 to 85:5:10 dichloromethane:methanol:triethylamine. Post-column yield 65%.

$^1$H NMR (500 MHz; CDCl$_3$) δ (ppm): 1.15 (t, J=7.1 Hz, 3H, C$\underline{H}_3$—CH$_2$); 1.16 (t, J=7.1 Hz, 3H, C$\underline{H}_3$—CH$_2$); 1.17 (t, J=7.1 Hz, 3H, C$\underline{H}_3$—CH$_2$); 1.52 (m, 2H, CH$_2$-β); 1.64 (m, 2H, CH$_2$-β); 2.3-2.6 (broad unresolved peak, 23H, CH$_2$-α and NH); 2.69 (t, J=7.2 Hz, 2H, CH$_2$—CO); 2.70 (t, J=7.2 Hz, 2H, CH$_2$—CO); 2.71 (t, J=7.2 Hz, 2H, CH$_2$—CO); 4.01 (q, J=7.1 Hz, 2H, CH$_3$—C$\underline{H}_2$); 4.02 (q, J=7.1 Hz, 2H, CH$_3$—C$\underline{H}_2$); 4.03 (q, J=7.1 Hz, 2H, CH$_3$—C$\underline{H}_2$).

$^{13}$C NMR (125 MHz; CDCl$_3$) δ (ppm): 14.6 (3C)($\underline{C}$H$_3$—CH$_2$); 25.3; 25.9 (CH$_2$-β); 31.5; 31.9; 31.9 ($\underline{C}$H$_2$—CO); 47.4; 48.3; 49.1; 49.2; 49.4; 50.3; 50.7; 51.4; 52.0; 52.7; 53.6 (CH$_2$-α); 60.7 (3C)(CH$_3$—$\underline{C}$H$_2$); 173.2 (C=O)(3C).

IR spectroscopy (KBr, cm$^{-1}$): 1729 ν(C=O).

Mass spectrometry (MALDI/TOF): m/z=500.82 (M$^{+\bullet}$).

Elemental analysis: Calculated: C, 59.97; H, 9.66; N, 11.03. Found: C, 59.68; H, 10.49; N, 11.19.

In the following examples, the synthesis of the materials according to the invention is described.

EXAMPLE 6

Preparation of a Material According to the Invention by Direct Grafting on (to) Polypropylene Fibres

EXAMPLE 6A

Grafting of poly-N-(4-vinylbenzyl)-cyclam on (to) polypropylene fibres 1.2 g (3.8 mmol) of the compound N-(4-vinylbenzyl)cyclam are dissolved in 8 g of DMF. The polypropylene fibres (109.5 mg), irradiated at 40 kGy, are added to this solution. After bubbling nitrogen for 30 minutes, the reaction medium is heated at 105° C. for hours. The fibres are washed with toluene, with ethanol and with ether and finally dried under vacuum. 115.9 mg of fibres are obtained.

Elemental analysis: N: 1.10%, i.e. 0.20 mmol/g of cyclam.

EXAMPLE 7

Preparation of a Material According to the Invention by Two-Step Grafting on (to) Polypropylene Fibres NB: in that which follows, the Roman numerals identifying the compounds do not refer to the numerals of the formulae already given above and in the claims.

7A: PP-ClSt I

A suspension of 2.47 g of polypropylene fibres, irradiated at 40 kGy, in a solution of 45 g (295 mmol) of chloromethylstyrene in 45 g of DMF is degassed under nitrogen for 30 minutes. The reaction medium is subsequently brought to a temperature of 115° C. under a nitrogen atmosphere for 4 hours. The fibres are subsequently washed with toluene, with ethanol and then with ether and finally dried under vacuum. The material PP-ClSt I is obtained in the form of a nonwoven (2.78 g). Increase in weight: 13%.

Elemental analysis: Cl: 2.75%, i.e. 0.77 mmol/g of chloromethyl functional groups.

7B: PP-ClSt-cyclam II

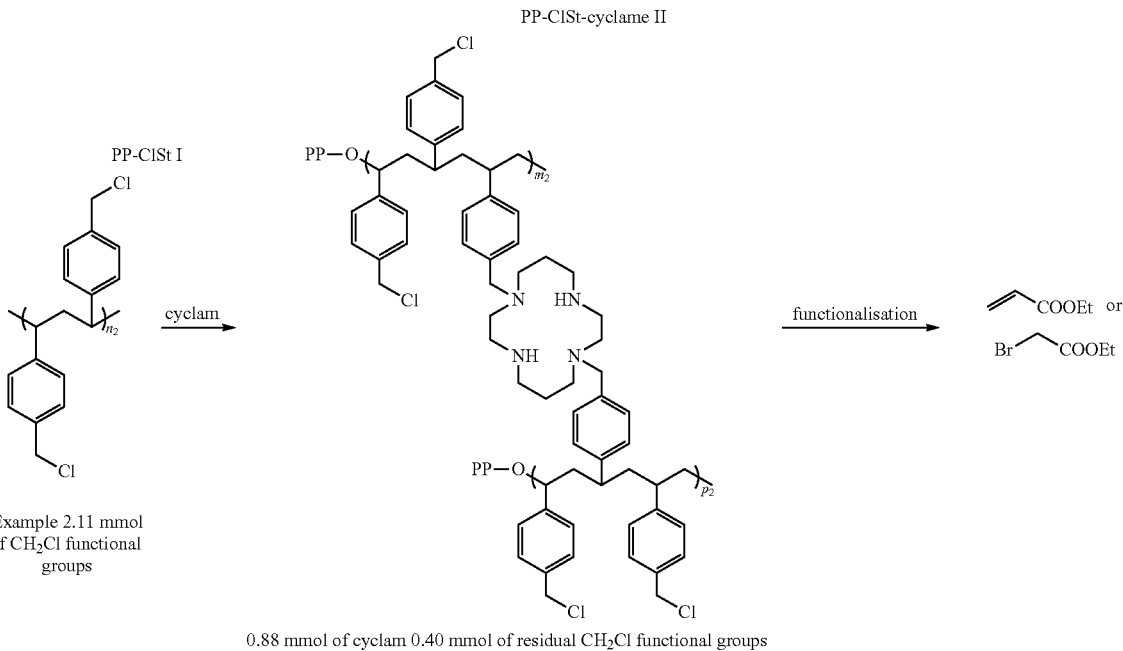

In the above formulae, $n_2$, $m_2$ and $p_2$ are integers from 10 to 1000.

A suspension of 2.73 g of the material PP-ClSt 1 and 3.5 g (24.3 mmol) of potassium carbonate, in a solution of 3.50 g (17.5 mmol) of cyclam (1) in 300 ml of acetonitrile, is heated at 60° C. for 60 hours. The fibres are washed with a water:ethanol mixture, until the aqueous wash liquors have returned to neutrality, then with ethanol, with toluene and finally with ether. After drying under vacuum, the material PP-ClSt-cyclam II is obtained in the form of a nonwoven (2.84 g).

Elemental analysis: N: 1.72%, i.e. 0.31 mmol/g of cyclam Cl: 0.49%, i.e. 0.14 mmol/g of residual chloromethyl functional groups.

7C: PP-ClSt III

A suspension of polypropylene fibres (1.39 g), irradiated at 40 kGy, in a solution of 24 g (157 mmol) of chloromethyl-styrene in 56 g of DMF is degassed under nitrogen for 30 minutes. The reaction medium is subsequently brought to a temperature of 115° C. under a nitrogen atmosphere for 17 hours. The fibres are subsequently washed with toluene, with ethanol and then with ether and finally dried under vacuum. The material PP-ClSt III is obtained in the form of a nonwoven (2.28 g). Increase in weight: 64%.

Elemental analysis: Cl: 8.17%, i.e. 2.30 mmol/g of chloromethyl functional groups.

IR spectroscopy (KBr, cm$^{-1}$): 3087; 3025 $\nu$(=C—H); 2960; 2922; 2837; 1724; 1611; 1512 $\nu$(C=C); 1451; 1377; 1264 $\delta$(CH$_2$); 1167; 1110; 1020; 998; 872; 840; 809 $\nu$(C=C—H); 708; 674.

7D: PP-ClSt-TE3AE IV

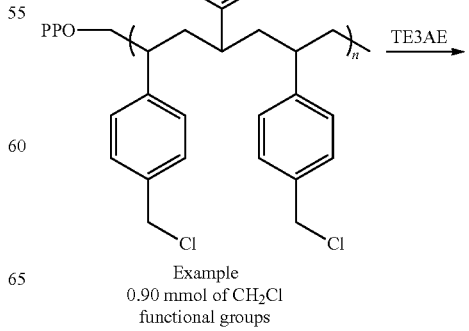

-continued

PP-ClSt-TE3AE IV

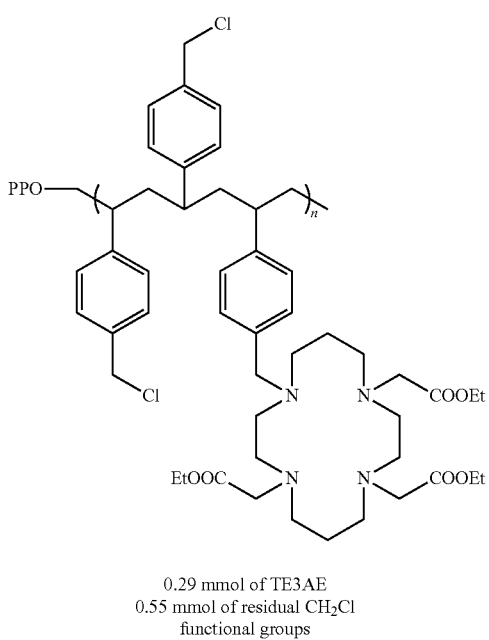

0.29 mmol of TE3AE
0.55 mmol of residual CH$_2$Cl functional groups

⟶ NaOH

PP-ClSt-TE3A V

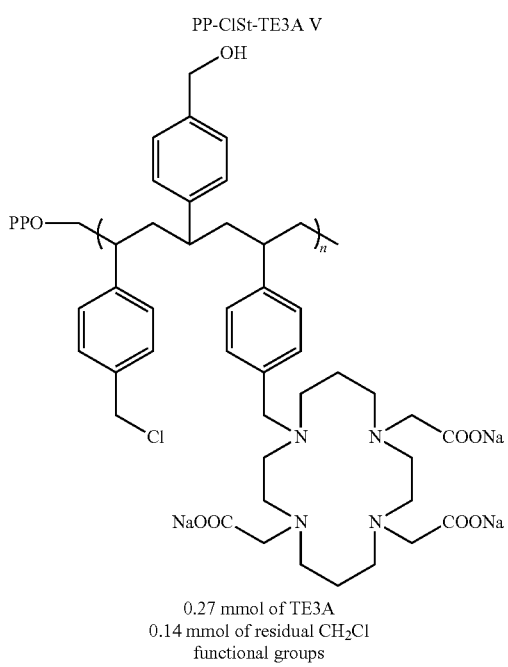

0.27 mmol of TE3A
0.14 mmol of residual CH$_2$Cl functional groups n = 10 to 1000

A suspension of 0.39 g of the material PP-ClSt III and 5.5 g (39.9 mmol) of potassium carbonate, in a solution of 1.67 g (3.65 mmol) of the triester 10 (TE3AE) in 50 ml of acetonitrile, is heated at 40° C. for 70 hours. The fibres are washed with a water:ethanol mixture, until the aqueous wash liquors have returned to neutrality, and then with ethanol, with toluene and finally with ether. After drying under vacuum, the material PP-ClSt-TE3AE IV is obtained in the form of a nonwoven (0.54 g).

IR spectroscopy (KBr, cm$^{-1}$): 3453; 2961; 2924; 2837; 1727 ν(C=O); 1634; 1611; 1511; 1449; 1376; 1261; 1153; 1111; 1028; 997; 971; 839; 807; 707; 671.

Elemental analysis: N: 3.02%, i.e. 0.54 mmol/g of TE3AE Cl: 3.59%, i.e. 1.01 mmol/g of residual chloromethyl functional groups.

7E: PP-ClSt-TE3A V

A 1M sodium hydroxide solution is prepared in the water:ethanol mixture in the 1:1 ratio by volume. The material PP-ClSt-TE3AE IV (0.51 g) is added to 80 ml of this solution. The reaction medium is stirred vigorously for 30 hours. The fibres are washed with a water:ethanol mixture, until the aqueous wash liquors have returned to neutrality, then with ethanol, with toluene and finally with ether. The material PP-ClSt-TE3A V is obtained in the form of a nonwoven (0.48 g).

IR spectroscopy (KBr, cm$^{-1}$): 3437; 2963; 2922; 2851; 1627; 1594 ν$_{as}$ (C=O); 1511; 1452; 1419 ν$_s$(C=O); 1384; 1261; 1097; 997; 972; 840; 807; 708.

Elemental analysis: N: 3.05%, i.e. 0.54 mmol/g of TE3A Cl: 1.03%, i.e. 0.29 mmol/g of residual chloromethyl functional groups.

7F: PP-MAnClSt VI

A suspension of polypropylene fibres (2.44 g), irradiated at 40 kGy, in a solution of 24 g (245 mmol) of maleic anhydride and 36 g (236 mmol) of chloromethylstyrene in 94 ml of acetone, is degassed under nitrogen for 30 minutes in an autoclave. The reaction medium is subsequently brought to a temperature of 90° C. under a nitrogen atmosphere for 20 hours. The fibres are subsequently washed with acetone, with toluene and then with ether and finally dried under vacuum. The material PP-MAnClSt VI is obtained in the form of a nonwoven (3.28 g). Increase in weight: 35%.

IR spectroscopy (KBr, cm$^{-1}$): 3402; 2959; 2925; 2838; 1858 ν$_{as}$ (C=O); 1782 ν$_s$(C=O); 1710; 1454; 1377; 1262 δ(CH$_2$); 1222; 1167; 1093 ν(C—O); 998; 973; 841; 806 δ(C=C—H); 711.

Elemental analysis: Cl: 3.53%, i.e. 0.99 mmol/g of chloromethyl functional groups O: 4.63%, i.e. 0.96 mmol/g of anhydride functional groups.

7G: PP-MAn-ClSt-TE3PE VII

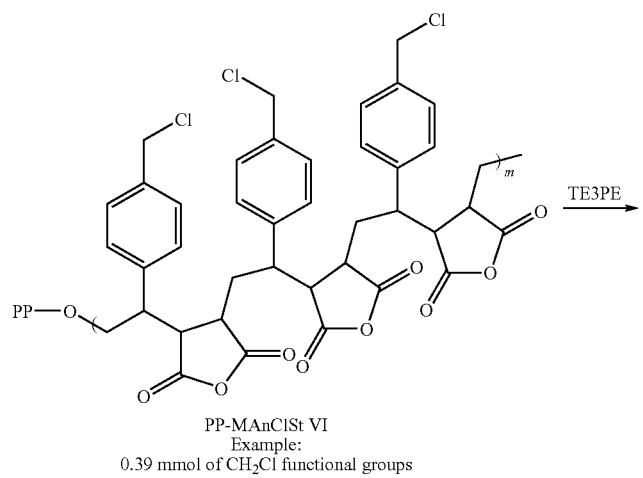
PP-MAnClSt VI
Example:
0.39 mmol of CH$_2$Cl functional groups
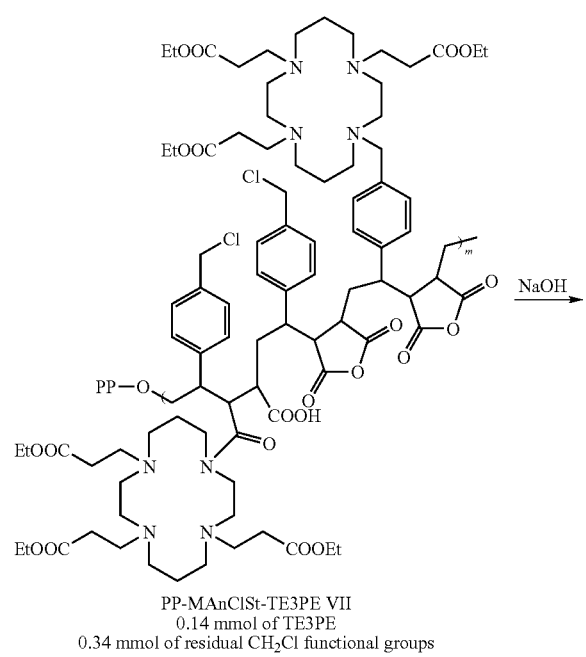
PP-MAnClSt-TE3PE VII
0.14 mmol of TE3PE
0.34 mmol of residual CH$_2$Cl functional groups

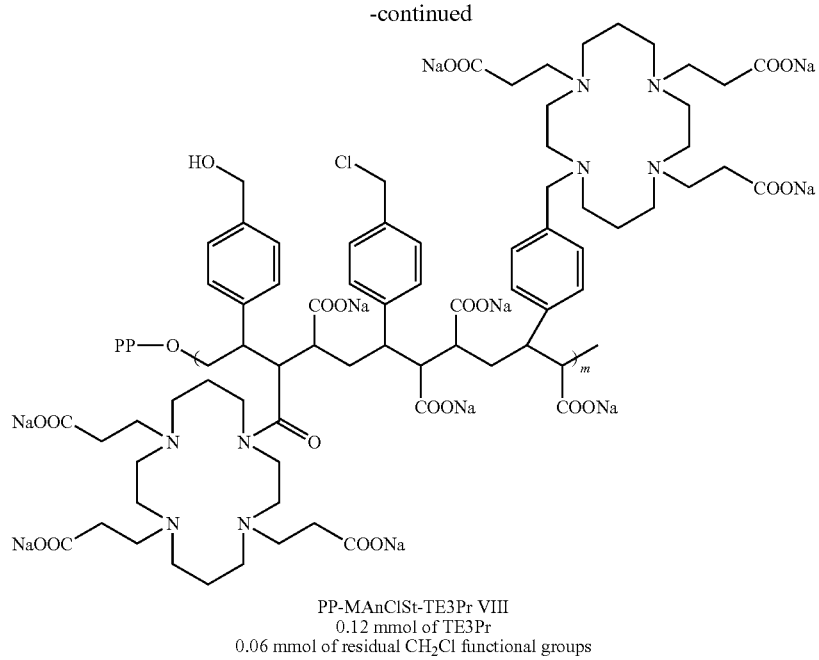

PP-MAnClSt-TE3Pr VIII
0.12 mmol of TE3Pr
0.06 mmol of residual CH$_2$Cl functional groups where m = 10 to 1000.

A suspension of 0.40 g of the material PP-MAnClSt VI and 2.8 g (20.3 mmol) of potassium carbonate, in a solution of 7.2 g (14.4 mmol) of triester 11 (TE3PE) in 350 ml of acetonitrile, is heated at 50° C. for 60 hours. The fibres are washed with a water:ethanol mixture, until the aqueous wash liquors have returned to neutrality, then with ethanol, with toluene and finally with ether. After drying under vacuum, the material PP-MAnClSt-TE3PE VII is obtained in the form of a nonwoven (0.46 g).

IR spectroscopy (KBr, cm$^{-1}$): 3430; 2957; 2921; 2837; 1855; 1781; 1733 v (C=O)$_{ester}$; 1631 v (C=O)$_{amide}$; 1456; 1377; 1256; 1167; 1100; 997; 972; 840; 808; 710.

Elemental analysis: N: 1.74%, i.e. 0.31 mmol/g of TE3PE Cl: 2.59%, i.e. 0.73 mmol/g of residual chloromethyl functional groups.

7H: PP-MAn-ClSt-TE3Pr VIII

A 0.5M solution of sodium hydroxide is prepared in the water:ethanol mixture in the 1:1 ratio by volume. The material PP-MAnClSt-TE3PE VII (0.42 g) is added to 80 ml of this solution. The reaction medium is stirred vigorously at ambient temperature for 18 hours and then at 40° C. for 16 hours. The fibres are washed with a water:ethanol mixture, until the aqueous wash liquors have returned to neutrality, and then with ethanol, with toluene and finally with ether. After drying under vacuum, the material PP-MAnClSt-TE3Pr VIII is obtained in the form of a nonwoven (0.41 g).

IR spectroscopy (KBr, cm$^{-1}$): 3427; 2958; 2922; 2837; 1717; 1582 v$_{as}$ (C=O); 1456; 1407 v$_s$ (C=O); 1377; 1261; 1166; 1093; 997; 972; 841; 807; 709.

Elemental analysis: N: 1.51%, i.e. 0.27 mmol/g of TE3Pr Cl: 0.46%, i.e. 0.13 mmol/g of residual chloromethyl functional groups.

EXAMPLE 8

Extractive Properties of the Materials

In this example, the extractive properties of the materials according to the invention with regard to uranyl, plutonium and cadmium are studied.

The ability to scavenge radioelements of the materials according to the invention is also compared with a reference material which is a material in which a TE3Pr ligand is grafted on (to) silica; this material is the material known as Si2323Pr ("route 1") prepared in the document [8] (WO-A-01/15806). Reference may in particular be made to pages 22 to 24 of this document.

It will be shown, in that which follows, that the ability to scavenge radioelements of some of the materials prepared according to the invention is greater than that of the reference material on a silica support.

The extractive properties of the materials are evaluated by the determination of the amount of metal fixed at equilibrium per gram of material. This value, determined for each material under absolutely identical conditions, is referred to as $q_e$ and is expressed in mmol/g. The experimental device employed to determine the $q_e$ values is described in FIG. 6.

It is known that, experimentally, the principle of solid-liquid extraction studies consists in bringing a sequestering material into contact with a solution with a known concentration of metal $c_0$, under highly specific conditions, for a period which makes it possible to achieve equilibrium.

In order to promote contact between the solution and the solid, the specific experimental device comprises a container (1) containing the solution (2), provided, for example, with magnetic stirring (3); a peristaltic pump (4) for circulating the solution (5) through pipes (6); a coil (7) thermostatically controlled, for example, at 50° C.; and a filter holder (8) in which the material is placed. The metal solution thus circulates in a loop, for example for 18 hours, in order to guarantee that equilibrium is obtained.

EXAMPLE 8A

Extraction of Uranyl and Plutonium

The amounts of metal scavenged by the solid $q_e$ for the different fibrous materials prepared but also for the silica-based reference material, used in the semi-industrial pilot unit[53] and known as "silica (route 1)", are given in Table 6 for the extraction of uranyl and in Table 7 for the extraction of plutonium.

TABLE 6

Abilities to extract uranyl of different materials (operating conditions: $[UO_2^{2+}]_0$ = 3.03 mmol/l; buffer acetic acid/acetate 0.1N of pH = 4.5; T = 50° C.; uncertainties: ±0.04). The degree of occupation of the macrocyclic sites is determined assuming the formation of complexes of ligand:metal 1:1 stoichiometry.

| Ligand | Material | Content of ligand (mmol/g) | $q_e$ (mmol/g) | Degree of occupation of the sites (%) |
|---|---|---|---|---|
| — | PP | 0 | 0 | — |
|  | PP - MAnClSt | 0 | <0.01 | <1 |
| TE3A | PP - ClSt | 0.76 | 0.2 | 26 |
|  | PP - ClSt | 0.82 | 0.27 | 33 |
|  | PP - MAnClSt | 0.26 | 0.02 | 8 |
| TE3Pr | PP - ClSt | 0.83 | 0.33 | 40 |
|  | PP - ClSt | 0.80 | 0.36 | 45 |
|  | PP - MAnClSt | 0.17 | 0.03 | 18 |
|  | Silica (route 1) | 0.35 | 0.21 | — |

TABLE 7

Abilities to extract plutonium of different materials (operating conditions: $[Pu^{4+}]_0$ = 3.54 mmol/l; buffer acetic acid/acetate 0.1N of pH = 4.7; T = 50° C.; uncertainties: ±0.03). The degree of occupation of the macrocyclic sites was determined assuming the formation of complexes of ligand:metal 1:1 stoichiometry.

| Ligand | Material | Content of ligand (mmol/g) | $q_e$ (mmol/g) | Degree of occupation of the sites (%) |
|---|---|---|---|---|
| TE3A | PP - ClSt | 0.37 | 0.28 | 76 |
|  | PP - ClSt | 0.54 | 0.38 | 71 |
|  | PP - MAnClSt | 0.60 | 0.20 | 33 |
| TE3Pr | PP - ClSt | 0.50 | 0.30 | 60 |
|  | PP - ClSt | 0.80 | 0.46 | 58 |
|  | PP - MAnClSt | 0.27 | 0.07 | 26 |
|  | Silica (route 1) | 0.35 | 0.08 | — |

The above Tables 6 and 7 show that ungrafted polypropylene has no ability to fix uranyl or plutonium (and more generally any dissolved metal element), which means that the scavenging of these elements is thus provided solely by the complexing by the macrocyclic ligands.

The neutrality of the polypropylene support in the scavenging constitutes a guarantee that the selectivity of the tetranitrogeneous macrocyclic molecules for the sequestration of the target metals is well retained. By comparison, it is known that unmodified silica already exhibits a strong adsorbent power of the silica with regard to uranyl[54] and a degree of ability to fix plutonium[55].

The materials prepared from the chloromethylstyrene spacer arm, i.e the materials referred to as PP-ClSt, exhibit a greater ability to fix radioelements than that of the reference material. The better performances of these modified organic fibres are attributed to a greater content of ligand and to functionalisation of the macrocycles by three coordinating arms. Overall, the materials prepared from the second spacer arm, that is to say the PP-MAnClSt materials, are less effective in fixing these two radioelements.

The ligand TE3A having the shortest (acetate) arms exhibits a better effectiveness for the scavenging of the spherical plutonium ion, whereas the propionate arms of the TE3Pr ligand are more suited to the complexing of the "rod" of uranyl.

The materials according to the invention have the ability to selectively scavenge uranyl in the competitive presence of calcium, potassium and sodium ions, which are the three predominant cationic metals of a real effluent.

In an equimolar mixture of each ion, only the uranyl is fixed to the material and the amount of radioelement scavenged is not reduced by the presence of the other cations (Table 8).

TABLE 8

Abilities to extract uranyl in the presence of sodium, potassium and calcium ions (operating conditions: $[UO_2^{2+}]_0$ = 3.03 mmol/l; $[Na^+]_0$ = 3.33 mmol/l; $[K^+]_0$ = 3.13 mmol/l; $[Ca^{2+}]_0$ = 2.83 mmol/l; buffer acetic acid/acetate 0.1 N of pH 4.7; T = 50° C.; uncertainties: ±0.04).

| Ligand | Material | Content of ligand (mmol/g) | $q_e$ (mmol/g) $UO_2^{2+}$ | $Ca^{2+}$ | $K^+$ | $Na^+$ |
|---|---|---|---|---|---|---|
| TE3A | PP - ClSt | 0.82 | 0.27 | — | — | — |
|  | PP - ClSt | 0.82 | 0.25 | <0.0006 | <0.02 | <0.02 |
| TE3P | PP - ClSt | 0.80 | 0.36 | — | — | — |
|  | PP - ClSt | 0.80 | 0.37 | <0.0006 | <0.02 | <0.02 |

EXAMPLE 8B

Extraction of Cadmium

The polypropylene fibres modified by tetranitrogeneous macrocyclic ligands exhibit true abilities to extract the element cadmium. These abilities are evaluated by the amount of metal $q_e$ fixed to the material at equilibrium (Table 9).

TABLE 9

Abilities to extract cadmium of materials PP-ClSt-TE3A and PP-ClSt-TE3Pr (operating conditions: T = 50° C.).

| | Buffer pH = 4.4; $[Co^{2+}]_0$ = 2.97 mmol/l | | | Buffer pH = 4.4; $[Co^{2+}]_0$ = 1.13 mmol/l | | | Buffer pH = 6.6; $[Co^{2+}]_0$ = 1.13 mmol/l | | |
|---|---|---|---|---|---|---|---|---|---|
| | Content of ligand (mmol/g) | $q_e$ (mmol/g) | Degree of occupation of the sites (%) | Content of ligand (mmol/g) | $q_e$ (mmol/g) | Degree of occupation of the sites (%) | Content of ligand (mmol/g) | $q_e$ (mmol/g) | Degree of occupation of the sites (%) |
| PP-ClSt-TE3A | 0.82 | 0.43 | 53 | 0.36 | 0.05 | 14 | 0.36 | 0.09 | 25 |
| PP-ClSt-TE3Pr | 0.80 | 0.04 | 5 | 0.50 | <0.01 | — | 0.50 | 0.06 | 12 |

The comparative experiments between the two grafted fibres show a very much greater fixing of cadmium when the ligand carrying acetate functional groups TE3A is immobilised.

BIBLIOGRAPHY

[1] J. S. Bradshaw, K. E. Krakowiak, B. J. Tarbet, R. L. Bruening, L. D. Griffin, D. E. Cash, T. D. Rasmussen, R. M. Izatta, *Solvent Extraction Ion Exchange*, 1989, 7, 855-864.

[2] R. M. Izatt, *Journal of Inclusion Phenomena and Molecular Recognition in Chemistry*, 1997, 29, 197-220.

[3] R. L. Bruening, K. E. Krakowiak, U.S. Pat. No. 6,232,265 B1 (Nov. 6, 1999).

[4] R. Guilard, F. Denat, O. Pernelet, R. Tripier, H. Ledon, C. Devos, Patent FR 99/01499 (Sep. 2, 1999).

[5] R. Guilard, B. Roux-Fouillet, G. Lagrange, M. Meyer, A. T. Bucaille, Patent WO 01/46202 (Dec. 12, 2000).

[6] R. Guilard, H. Chollet, P. Guiberteau, P. Cocolios, Patent WO 96/11056 (Apr. 10, 1995).

[7] R. Guilard, H. Chollet, P. Guiberteau, M. Guérin, Patent WO 96/11478 (Apr. 10, 1995).

[8] H. Chollet, J.-L. Babouhot, F. Barbette, R. Guilard, Patent WO 01/15806 (25/08/2000).

[9] D. Woehrle, V. Nicolaus, *Polymer Bulletin*, 1986, 15, 185-192.

[10] V. Louvet, P. Appriou, H. Handel, *Tetrahedron Letters*, 1982, 23, 2445-2448.

[11] W. Szczepaniak, K. Kuczynski, *Reactive Polymers*, 1985, 3, 101-106.

[12] C. Kavakli, N. Ozvatan, S. A. Tuncel, B. Salih, *Analytica Chimica Acta*, 2002, 464, 313-322.

[13] H. Handel, H. Chaumeil, Patent EP 0 287 436 (Jul. 4, 1988).

[14] S. Amigoni-Gerbier, C. Larpent, *Macromolecules*, 1999, 32, 9071-9073.

[15] B. Altava, M. I. Burguete, J. C. Frias, E. Garcia-Espana, S. V. Luis, J. F. Miravet, *Industrial & Engineering Chemistry Research*, 2000, 39, 3589-3595.

[16] S.-H. Choi, Y. C. Nho, *Journal of Macromolecular Science, Pure and Applied Chemistry*, 2000, A37, 1053-1068.

[17] N. Kabay, A. Katakai, T. Sugo, H. Egawa, *Journal of Applied Polymer Science*, 1993, 49, 599-607.

[18] A. M. Dessouki, M. El-Tahawy, H. El-Boohy, S. A. El-Mongy, S. M. Badawy, *Radiation. Physics and Chemistry*, 1999, 54, 627-635.

[19] R. Saliba, H. Gauthier, R. Gauthier, M. Petit-Ramel, *Journal of Applied Polymer Science*, 2000, 75, 1624-1631.

[20] H. J. Fischer, K. H. Lieser, *Angewandte Makromolekulare Chemie*, 1993, 208, 133-150.

[21] N. Nambu, O. Ito, N. Mihara, T. Doi, Patent WO 00/04931 (20/07/1998).

[22] N. Nambu, O. Ito, T. Doi, Patent JP 01/123381.

[23] N. Bicak, D. C. Sherrington, B. F. Senkal, *Reactive & Functional Polymers*, 1999, 41, 69-76.

[24] X. Chang, Y. Li, G. Zhan, X. Luo, W. Gao, *Talanta*, 1996, 43, 407-413.

[25] B. Gong, *Talanta*, 2002, 57, 89-95.

[26] X. Chang, Q. Su, D. Liang, X. Wei, B. Wang, *Talanta*, 2002, 57, 253-261.

[27] S.-H. Choi, Y. C. Nho, *Journal of Applied Polymer Science*, 1999, 71, 999-1006.

[28] R. L. Bruening, K. E. Krakowiak, A. J. Dileo, T. Jiang, U.S. Pat. No. 6,479,159 B1 (19/04/2001).

[29] P. Le Thuaut, B. Martel, G. Crini, U. Maschke, X. Coqueret, M. Morcellet, *Journal of Applied Polymer Science*, 2000, 77, 2118-2125.

[30] B. Martel, P. Le Thuaut, G. Crini, M. Morcellet, A.-M. Naggi, U. Maschke, S. Bertini, C. Vecchi, X. Coqueret, G. Toni, *Journal of Applied Polymer Science*, 2000, 78, 2166-2173.

[31] E. Buyuktuncel, S. Bektas, O. Genc, A. Denizli, *Reactive & Functional Polymers*, 2001, 47, 1-10.

[32] D. L. Cho, C. N. Choi, H. J. Kim, A. K. Kim, J.-H. Go, *Journal of Applied Polymer Science*, 2001, 82, 839-846.

[33] S. Degni, C.-E. Wilen, R. Leino, *Organic Letters*, 2001, 3, 2551-2554.

[34] L. C. Lopergolo, L. H. Catalani, L. D. B. Machado, P. R. Rela, A. B. Lugao, *Radiation Physics and Chemistry*, 2000, 57, 451-454.

[35] Y. Lu, Z. Zhang, H. Zeng, *Journal of Applied Polymer Science*, 1994, 53, 405-410.

[36] D. Chen, N. Shi, D. Xu, *Journal of Applied Polymer Science*, 1999, 73, 1357-1362.

[37] S. H. Choi, H. J. Kang, E. N. Ryu, K. P. Lee, *Radiation Physics and Chemistry*, 2001, 60, 495-502.

[38] Z. Xu, J. Wang, L. Shen, D. Men, Y. Xu, *Journal of Membrane Science*, 2002, 196, 221-229.

[39] I. Kaur, S. Kumar, B. N. Misra, *Polymers & Polymer Composites*, 1995, 3, 375-383.

[40] S. Tan, G. Li, J. Shen, *Journal of Applied Polymer Science*, 2000, 77, 1861-1868.

[41] S. S. Ivanchev, M. Ratzsch, A. M. Mesh, S. Y. Khaikin, H. Bucka, A. Hesse, *Vysokomolekulyarnye Soedineniya, Seriya A i Seriya B*, 2001, 43, 793-798.

[42] E. Tsuchida, T. Tomono, *Makromolekulare Chemie*, 1971, 141, 265-298.

[43] G. S. Chauhan, L. K. Guleria, B. N. Misra, I. Kaur, *Journal of Polymer Science, Part A: Polymer Chemistry*, 1999, 37, 1763-1769.

[44] H. A. A. El-Rehim, E. A. Hegazy, A. E.-H. Ali, *Reactive & Functional Polymers*, 2000, 43, 105-116.

[45] D. C. Clark, W. E. Baker, R. A. Whitney, *Journal of Applied Polymer Science*, 2000, 79, 96-107.

[46] D. Jia, Y. Luo, Y. Li, H. Lu, W. Fu, W. L. Cheung, *Journal of Applied Polymer Science*, 2000, 78, 2482-2487.

[47] P. Citovicky, V. Chrastova, M. Foldesova, *European Polymer Journal*, 1996, 32, 153-158.

[48] L. J. Andrews, R. M. Keefer, *Journal of the American Chemical Society*, 1953, 75, 3776-3779.

[49] Z. M. Rzaev, L. V. Bryksina, S. I. Sadykh-Zade, *Journal of Polymer Science*, 1973, 42, 519-529.

[50] S. Iwatsuki, Y. Yamashita, *Makromol. Chem.*, 1965, 89, 205-213.

[51] R. Guilard, I. Meunier, C. Jean, B. Boisselier-Cocolios, Patent EP 0 427 595 (31/10/1990).

[52] P. Cocolios, R. Guilard, C. Gros, Patent WO 96/11189 (May 10, 1995).

[53] F. Barbette, Thèse de l'Universite de Bourgogne [Thesis of the University of Burgundy], 1999.

[54] J. D. Prikryl, A. Jain, D. R. Turner, R. T. Pabalan, *Journal of Contaminant Hydrology*, 2001, 47, 241-253.

[55] H. Chollet, Thèse de l'Université de Bourgogne [Thesis of the University of Burgundy], 1994.

[56] Y. C. Nho, J. Chen, J. H. Jin, *Radiation Physics and Chemistry*, 1999, 54, 317-322.

[57] A. C. Patel, R. B. Brahmbhatt, P. V. C. Rao, K. V. Rao, S. Devi, *European Polymer Journal*, 2000, 36, 2477-2484.

[58] I. Kaur, S. Kumar, B. N. Misra, G. S. Chauhan, *Materials Science & Engineering, A: Structural Materials: Properties, Microstructure and Processing*, 1999, A270, 137-144.

The invention claimed is:

1. A material comprising:
polypropylene fibers comprising a polyazacycloalkane group;
wherein
the polyazacycloalkane group is grafted on the polypropylene fibers with free radically polymerized monomers, and
the polyazocycloalkane group is an alkane macrocycle wherein more than one carbon atom of the cyclic ring are substituted by nitrogen atoms.

2. The material according to claim 1, wherein the material is obtained by a process comprising:
radical polymerisation of a polyazacycloalkane monomer having a group which is polymerised under free radical conditions, in the presence of polypropylene fibres having at least one of peroxide and hydroperoxide functional groups,
optionally followed by
functionalisation of a free amine group of the polyazacycloalkane,
saponification of an optionally present ester group of the polyazacycloalkane, or
hydrolysis of the optionally present ester group of the polyazacycloalkane.

3. The material according to claim 1, wherein the material is obtained by a process comprising:
a) radical polymerisation of one or more free radically polymerizable monomers in the presence of polypropylene fibres having at least one of peroxide and hydroperoxide functional groups, to obtain a polymer grafted on the polypropylene fibers, wherein at least one of the monomers comprises a functional group capable of reacting with a free amine functional group and the functional group is on the grafted polymer;
b) reaction of the functional group of the grafted polymer with an amine group of a polyazacycloalkane to obtain the polypropylene fibers comprising a polyazacycloalkane group;
c) optionally, functionalization of a free amine group present, of the grafted polyazacycloalkane; and
d) optionally, saponification of an optionally present ester group of the polyazacycloalkane,
or hydrolysis of the optionally present ester group optionally carried by the polyazacycloalkane.

4. The material according to claim 2, wherein the polyazacycloalkane monomer is one selected from the group consisting of formulae (I), (II) and (III):

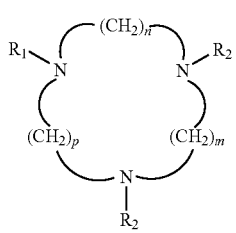

(I)

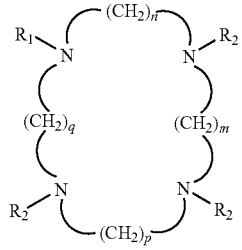

(II)

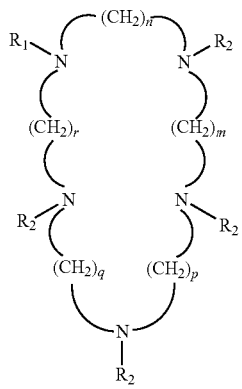

(III)

wherein
n, m, p, q and r, are each, independently, 2 or 3;
$R_1$ is a group which can be polymerised under radical conditions;
$R_2$ is a hydrogen atom or a $—(CH_2)_2—R_3$ group, wherein $R_3$ is a group selected from the group consisting of $CONH_2$, $CH_2OH$, $CN$ and $COOR_4$, and
$R_4$ is H, a cation, an alkyl group of 1 to 10 carbon atoms or a benzyl group; or
$R_2$ is a $—(CH_2)—R_5$ group, wherein $R_5$ is $COOR_6$ or $PO_3R_6$, and $R_6$ is an alkyl group of 1 to 10 carbon atoms, a hydrogen atom or a cation.

5. The material according to claim 2, wherein the group polymerised under radical conditions is selected from the group consisting of a vinyl monomer, a styrene monomer and an acrylic monomer.

6. The material according to claim 5, wherein the group polymerised under radical conditions is selected from the group consisting of an acrylonitrile derivative, an acryloyl derivative, an acrylic acid, a vinylpyridine, a vinylalkoxysilane and a 4-vinylbenzyl group.

7. The material according to claim 2, wherein the polyazacycloalkane monomer is is at least one of N-(4-vinylbenzyl) cyclam and N,N',N''-tris (2-ethoxycarbonylethyl)-N'''-(4-vinylbenzyl)cyclam.

8. The material according to claim 2, which is of formula (IV):

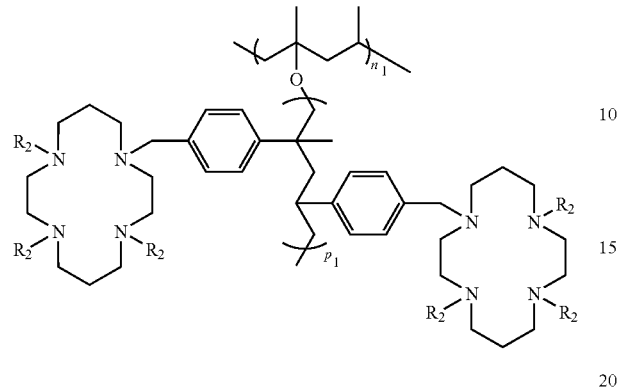

(IV)

wherein:
$R_2$ is a hydrogen atom or a —$(CH_2)_2$—$R_3$ group, wherein $R_3$ is a group selected from the group consisting of $CONH_2$, $CH_2OH$, CN and $COOR_4$, and $R_4$ represents H, a cation, an alkyl group of 1 to 10 carbon atoms or a benzyl group; or $R_2$ is a —$(CH_2)$—$R_5$ group, wherein $R_5$ is $COOR_6$ or $PO_3R_6$, and $R_6$ is an alkyl group of 1 to 10 carbon atoms, a hydrogen atom or a cation;

$n_1$ is an integer from 100 to 3000; and $p_1$ is an integer from 10 to 1000.

9. The material according to claim 8, wherein $R_2$ is H or a group selected from the group consisting of $CH_2CH_2COOEt$, $CH_2CH_2COOH$, $CH_2CH_2COONa$, $CH_2COOEt$, $CH_2COOH$ and $CH_2COONa$.

10. The material according to claim 3, wherein the functional group capable of reacting with the amine group of the polyazacycloalkane is selected from the group consisting of electrophilic carbons carrying halide, OTs or OTf functional groups, or carboxylic acid derivatives.

11. The material according to claim 3, wherein the-free radically polymerizable monomers are selected from the group consisting of vinyl, styrene and acrylic monomers.

12. The material according to claim 10, wherein, the polymer grafted on the polypropylene fibers is a chloromethylstyrene homopolymer.

13. The material according to claim 11, wherein, the polymer grafted on the polypropylene fibers is an alternating copolymer of chloromethylstyrene and maleic anhydride: poly(maleic anhydride-alt-chloromethylstyrene).

14. The material according to claim 3, wherein the polyazacycloalkane is selected from the group of polyazacycloalkanes consisting of polyazacycloalkanes of formulae (V), (VI) and (VII):

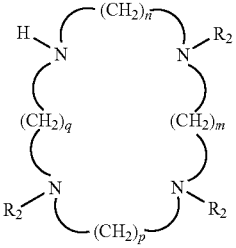

(V)

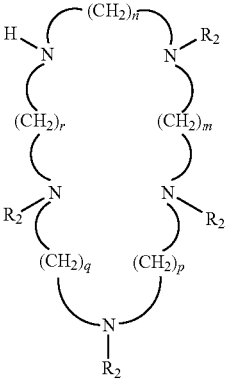

(VI)

(VII)

wherein n, m, p, q and r, are each, independently 2 or 3;

$R_2$ is a hydrogen atom or a —$(CH_2)_2$—$R_3$ group, wherein $R_3$ is a group selected from the group consisting of $CONH_2$, $CH_2OH$, CN and $COOR_4$, and $R_4$ is H, a cation, an alkyl group of 1 to 10 carbon atoms or a benzyl group; or $R_2$ is a —$(CH_2)$—$R_5$ group, wherein $R_5$ is $COOR_6$ or $PO_3R_6$, and $R_6$ is an alkyl group of 1 to 10 carbon atoms, a hydrogen atom or a cation.

15. The material according to claim 14, wherein the polyazacycloalkane is selected from the group consisting of the following compounds:

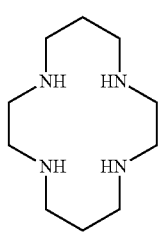

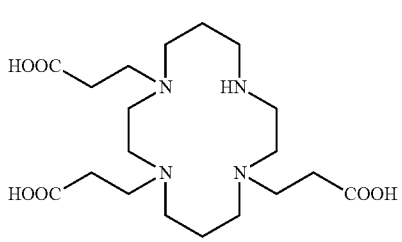

(TE3P)

1,4,8-tris(2-carboxyethyl)-1,4,8,11-tetraazacyclotetradecane

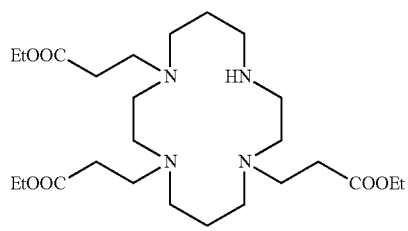

(TE3PE)

1,4,8-tris(ethoxycarbonylethyl)-
1,4,8,11-tetraazacyclotetradecane

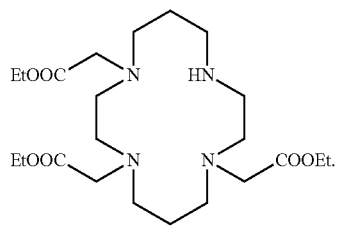

(TE3AE)

1,4,8-tris(ethoxycarbonylmethyl)-
1,4,8,11-tetraazacyclotetradecane

16. The material according to claim 3, which which is of formula (VIII) or (IX):

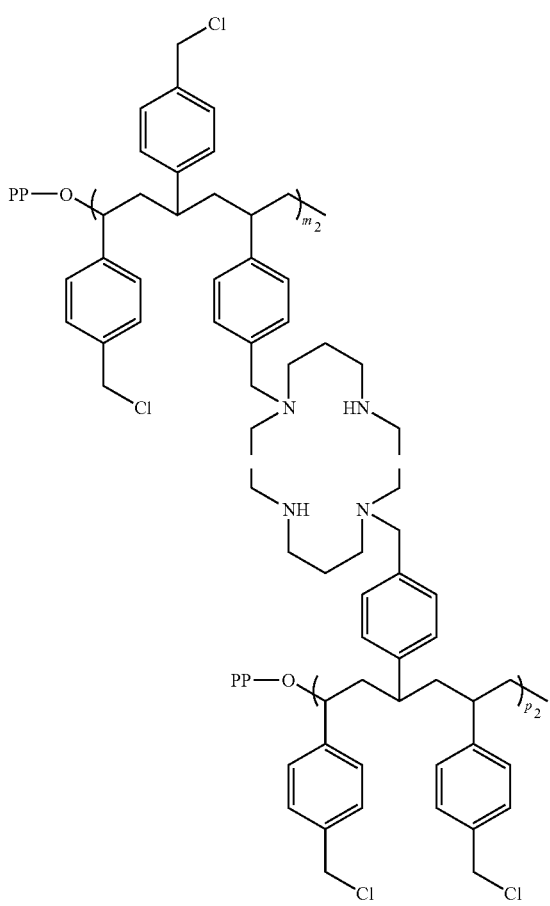

(VIII)

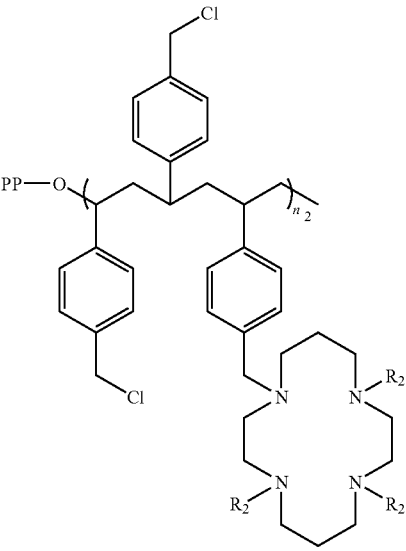

(IX)

wherein $R_2$ is a hydrogen atom or a —$(CH_2)_2$—$R_3$ group, wherein $R_3$ is a group selected from the group consisting of $CONH_2$, $CH_2OH$, $CN$ and $COOR_4$, and $R_4$ is H, a cation, an alkyl group of 1 to 10 carbon atoms or a benzyl group; or $R_2$ is a —$(CH_2)$—$R_5$ group, wherein $R_5$ is $COOR_6$ or $PO_3R_6$, and $R_6$ is an alkyl group of 1 to 10 carbon atoms, a hydrogen atom or a cation;

$m_2$ is an integer from 10 to 1000;

$n_2$ is an integer from 10 to 1000; and $p_2$ is an integer from 10 to 1000.

17. The material according to claim 16, wherein $R_2$ represents is a group selected from the group consisting of —$(CH_2)_2COONa$, —$CH_2COOEt$, —$(CH_2)_2$—$COOEt$, —$(CH_2)_2$—$COOH$, —$CH_2$—$COOH$ and —$CH_2$—$COONa$.

18. The material according claim 2, wherein the optional functionalisation of the free amine functional group or groups of the polyazacycloalkane is conducted by a process, comprising:

reacting the free amine group or groups with a compound comprising at least one functional group capable of reacting with a free amine group of a polyazacycloalkane and at least one of $R_3$ and $R_5$, wherein $R_3$ is a group chosen from the group consisting of $CONH_2$, $CH_2OH$, $CN$ and $COOR_4$, and $R_4$ is H, a cation, an alkyl group of 1 to 10 carbon atoms or a benzyl group, and wherein $R_5$ is $COOR_6$ or $PO_3R_6$, and $R_6$ is an alkyl group of 1 to 10 carbon atoms, a hydrogen atom or a cation.

19. The material according to claim 18, wherein the compound comprising at least one functional group capable of reacting with a free amine functional group of a polyazacycloalkane is ethyl bromoacetate or ethyl acrylate.

20. The material according to claim 2, wherein the saponification or hydrolysis of the ester functional groups is carried out under conditions that result in complete hydrolysis of the ester functional groups.

21. The material according to claim 20, wherein the saponification or hydrolysis of the ester functional groups is conducted at 40° C. for 18 hours with 0.5 N sodium hydroxide.

22. The material according to claim 1, wherein the polypropylene fibers are in the form of a nonwoven.

23. The material according to claim 2, wherein the polypropylene fibers having at least one of peroxide and hydroperoxide groups are obtained by a process comprising irradiation of polypropylene fibers by electrons under an oxidising atmosphere.

\* \* \* \* \*